US012769985B2

(12) United States Patent
Mentzer et al.

(10) Patent No.: US 12,769,985 B2
(45) Date of Patent: Oct. 20, 2026

(54) GENERATING MULTIMODAL DATA USING A MEDIA ITEM GENERATION NEURAL NETWORK AND A TOKEN GENERATION NEURAL NETWORK

(71) Applicant: GDM Holding LLC, Mountain View, CA (US)

(72) Inventors: Fabian Julius Mentzer, Zurich (CH); Kaushik Shivakumar, Cupertino, CA (US); Robert Junior Riachi, Mountain View, CA (US); Abhishek Sinha, Mountain View, CA (US); Xiaoyue Guo, New York, NY (US); Mostafa Dehghani, Amsterdam (NL)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 19/417,226

(22) Filed: Dec. 11, 2025

(65) Prior Publication Data

US 2026/0161928 A1 Jun. 11, 2026

Related U.S. Application Data

(60) Provisional application No. 63/730,947, filed on Dec. 11, 2024.

(51) Int. Cl.
*G06N 3/04* (2023.01)
*G06N 3/0455* (2023.01)
*G06N 3/08* (2023.01)

(52) U.S. Cl.
CPC ............. *G06N 3/0455* (2023.01); *G06N 3/08* (2013.01)

(58) Field of Classification Search
None
See application file for complete search history.

(56) References Cited

U.S. PATENT DOCUMENTS

| | | | | |
|---|---|---|---|---|
| 2019/0126472 | A1 | 5/2019 | Tunyasuvunakool et al. | |
| 2023/0108579 | A1* | 4/2023 | Cao | G06N 3/04 706/27 |
| 2023/0252224 | A1* | 8/2023 | Tran | G06F 40/56 715/256 |
| 2024/0320529 | A1* | 9/2024 | Dathathri | G06F 21/16 |
| 2024/0320714 | A1* | 9/2024 | West | G06F 9/453 |

FOREIGN PATENT DOCUMENTS

| | | |
|---|---|---|
| DE | 202024103305 U1 | 8/2024 |

OTHER PUBLICATIONS

Wu et al ("Personalized Multimodal Large Language Models: A Survey" Dec. 3, 2024) (Year: 2024).*

(Continued)

*Primary Examiner* — Lut Wong
(74) *Attorney, Agent, or Firm* — Fish & Richardson P.C.

(57) ABSTRACT

A computer-implemented method of generating multimodal data. The method comprises using a token generation neural network to generate, autoregressively, an output sequence of multimodal tokens. As part of this, a media item, e.g., an image, audio, or video, can be generated conditioned on features of a current output sequence generated by the token generation neural network and an encoded representation of one or more input media items generated by a media encoder neural network.

21 Claims, 5 Drawing Sheets

(56) References Cited

OTHER PUBLICATIONS

Abbeel et al., "Apprenticeship learning via inverse reinforcement learning," ICML '04: Proceedings of the twenty-first international conference on Machine learning, Jul. 4, 2004, 8 pages.
Bakker et al., "Robot see, robot do: An overview of robot imitation," AISB96 Workshop on Learning in Robots and Animals, 1996, 10 pages.
Baram et al., "End-to-end differentiable adversarial imitation learning," Proceedings of the 34th International Conference on Machine Learning, 2017, 70:390-399.
Barth-Maron et al., "Distributed distributional deterministic policy gradients," CoRR, submitted on Apr. 23, 2018, arXiv:1804.08617, 16 pages.
Bellemare et al., "A distributional perspective on reinforcement learning," CoRR, submitted on Jul. 21, 2017, arXiv:1707.06887, 19 pages.
Blondé et al., "Sample-efficient imitation learning via generative adversarial nets," CoRR, submitted on Sep. 6, 2018, arXiv:1809.02064, 10 pages.
Chen, et al., "PaLI-X: On Scaling up a Multilingual Vision and Language Model," CoRR, submitted on May 29, 2023, arXiv:2305.18565v1, 30 pages.
Clevert et al., "Fast and accurate deep network learning by exponential linear units (elus)," CoRR, submitted on Nov. 23, 2015, arXiv:1511.07289, 14 pages.
Duan et al., "One-shot imitation learning," Advances in neural information processing systems 30 (NIPS 2017), pp. 1087-1098.
Finn et al., "A connection between generative adversarial optimization," CoRR, submitted on Nov. 11, 2016, arxiv.org/abs/1611.03852, 10 pages.
Finn et al., "One-shot visual imitation learning via meta-learning," CoRR, submitted on Sep. 14, 2017, arXiv:1709.04905, 12 pages.
Fu et al., "Learning robust rewards with adversarial inverse reinforcement learning," International Conference on Learning Representations, Feb. 15, 2018, 15 pages.
Gemmeke et al., "Audio set: An ontology and human-labeled dataset for audio events," 2017 IEEE International Conference on Acoustics, Speech and Signal Processing (ICASSP), Mar. 5-9, 2017, pp. 776-780.
Goodfellow et al., "Generative adversarial nets," Advances in Neural Information Processing Systems 27 (NIPS 2014), 2014, pp. 2672-2680.
Hester et al., "Deep Q-learning from demonstrations," Proceedings of the AAAI Conference on Artificial Intelligence, Apr. 29, 2018, 32(1):3223-3230.
Ho et al., "Classifier-Free Diffusion Guidance," CoRR, Jul. 26, 2022, arXiv:2207.12598, 14 pages.
Ho et al., "Denoising Diffusion Probabilistic Models," CoRR, submitted on Jun. 19, 2020, arXiv:2006:11239, 25 pages.
Ho et al., "Generative Adversarial Imitation Learning," 30th Conference on Neural Information Processing Systems (NIPS 2016), Barcelona, Spain, Dec. 5, 2016, pp. 4565-4573.
Horgan et al., "Distributed prioritized experience replay," CoRR, submitted on Mar. 2, 2018, arXiv:1803.00933, 19 pages.
International Preliminary Report on Patentability in International Appln. No. PCT/EP2020/070164, mailed on Jan. 27, 2022, 10 pages.
International Search Report and Written Opinion in International Appln. No. PCT/EP2020/070164, mailed on Oct. 27, 2020, 17 pages.
Jia et al., "Scaling Up Visual and Vision-Language Representation Learning With Noisy Text Supervision," CoRR, submitted on Feb. 11, 2021, arXiv:2102.05918, 14 pages.
Kay et al., "The Kinetics Human Action Video Dataset," CoRR, submitted on May 19, 2017, arXiv:1705.06950, 22 pages.
Kingma et al., "Adam: A method for stochastic optimization," CoRR, submitted on Dec. 22, 2014, arXiv:1412.6980, 15 pages.
Kuznetsova et al., "The Open Images Dataset V4: Unified image classification, object detection, and visual relationship detection at scale," CoRR, submitted on Nov. 2, 2018, arXiv:1811.00982, 26 pages.
Li et al., "Infogail: Interpretable imitation learning from visual demonstrations," Advances in Neural Information Processing Systems 30 (NIPS 2017), 11 pages.
Merel et al., "Learning human behaviors from motion capture by adversarial imitation," CoRR, Jul. 7, 2017, arXiv:1707.02201, 12 pages.
Miyamoto et al., "A kendama learning robot based on bidirectional theory," Neural Networks, Nov. 1996, 9(8):1281-1302.
Miyato et al., "Spectral normalization for generative adversarial networks," International Conference on Learning Representations, Feb. 18, 2018, 26 pages.
Ng et al., "Algorithms for inverse reinforcement learning," ICML '00: Proceedings of the Seventeenth International Conference on Machine Learning, Jun. 29, 2000, pp. 663-670.
Peng et al., "Variational Discriminator Bottleneck: Improving Imitation Learning, Inverse RL, and GANs by Constraining Information Fl ow," CoRR, submitted on Dec. 29, 2018, arXiv:1810.00821v3, 27 pages.
Pohlen et al., "Observe and look further: Achieving consistent performance on Atari," CoRR, submitted on May 29, 2018, arXiv:1805.11593, 19 pages.
Pomerleau, "ALVINN: An autonomous land vehicle in a neural network," Advances in Neural Information Processing Systems 1 (NIPS 1988), 1988, pp. 305-313.
Rahmatizadeh et al., "Vision-based multi-task manipulation for inexpensive robots using end-to-end learning from demonstration," 2018 IEEE International Conference on Robotics and Automation (ICRA), May 21-25, 2018, pp. 3758-3765.
Rajeswaran et al., "Learning complex dexterous manipulation with deep reinforcement learning and demonstrations," CoRR, submitted on Sep. 28, 2017, arXiv:1709.10087, 9 pages.
Reed et al., "Visual imitation with a minimal adversary," International Conference on Learning Representations, Sep. 27, 2018, 13 pages.
Rombach et al., "High-Resolution Image Synthesis With Latent Diffusion Models," CoRR, Dec. 20, 2021, arXiv:2112.10752, 45 pages.
Ross et al., "A reduction of imitation learning and structured prediction to no-regret online learning," Proceedings of the Fourteenth International Conference on Artificial Intelligence and Statistics, 2011, 15:627-635.
Ruhe et al., "Rolling Diffusion Models," CoRR, submitted on Feb. 12, 2024, arXiv:2402.09470, 18 pages.
Sasaki et al., "Sample efficient imitation learning for continuous control," International Conference on Learning Representations, Dec. 20, 2018, 12 pages.
Schaal, "Learning from demonstration," Advances in Neural Information Processing Systems 9 (NIPS 1996), 1996, 7 pages.
Sharma et al., "Conceptual Captions: A Cleaned, Hypernymed, Image Alt-text Dataset for Automatic Image Captioning," Proceedings of the 56th Annual Meeting of the Association for Computational Linguistics (vol. 1: Long Papers), Jul. 2018, Melbourne, Australia, pp. 2556-2565.
Silver et al., "Deterministic policy gradient algorithms," Proceedings of the 31st International Conference on Machine Learning, 2014, 32(1):387-395.
Singh et al., "End-to-end robotic reinforcement learning without reward engineering," CoRR, Apr. 16, 2019, arXiv:1904.07854, 14 pages.
Stadie et al., "Third-Person Imitation Learning," CoRR, submitted on Mar. 6, 2017, arXiv:1703.01703v1, 16 pages.
Todorov et al., "MuJoco: A physics engine for model-based control," 2012 IEEE/RSJ International Conference on Intelligent Robots and Systems, Oct. 7-12, 2012, pp. 5026-5033.
Ulyanov et al., "Instance normalization: The missing ingredient for fast stylization," CoRR, Jul. 27, 2016, arXiv:1607.08022, 6 pages.
Vaswani et al., "Attention Is All You Need," CoRR, submitted on Jun. 12, 2017, arxiv.org/abs/1706.03762, 15 pages.
Vecerik et al., "Leveraging demonstrations for deep reinforcement learning on robotics problems with sparse rewards," CoRR, Jul. 27, 2017, arxiv.org/abs/1707.08817, 10 pages.

(56) References Cited

OTHER PUBLICATIONS

Walke et al., "Bridgedata v2: A dataset for robot learning at scale," Proceedings of The 7th Conference on Robot Learning, 2023, PMLR 229:1723-1736.
Yu et al., "CoCa: Contrastive Captioners are Image-Text Foundation Models," CoRR, submitted on May 4, 2022, arXiv:2205.01917, 19 pages.
Zhu et al., "Reinforcement and imitation learning for diverse visuomotor skills," CoRR, Feb. 26, 2018, arxiv.org/abs/1802.09564, 12 pages.
Ziebart et al., "Maximum entropy inverse reinforcement learning," Proceedings of the Twenty-Third AAAI Conference on Artificial Intelligence, 2008, 8:1433-1438.
International Search Report and Written Opinion in International Appln. No. PCT/US2025/059248, mailed on Apr. 23, 2026, 17 pages.
Li et al., "InstructAny2Pix: Flexible Visual Editing via Multimodal Instruction Following," CoRR, submitted on Oct. 17, 2024, arXiv:2312.06738v4, 26 pages.
Podell et al., "SDXL: Improving Latent Diffusion Models for High-Resolution Image Synthesis," CoRR, submitted on Jul. 4, 2023, arXiv:2307.01952v1, 21 pages.
Xia et al., "LLMGA: Multimodal Large Language Model based Generation Assistant," CoRR, submitted on Mar. 11, 2024, arXiv:2311.16500v3, 18 pages.

* cited by examiner

GENERATING MULTIMODAL DATA USING A MEDIA ITEM GENERATION NEURAL NETWORK AND A TOKEN GENERATION NEURAL NETWORK

CROSS-REFERENCE TO RELATED APPLICATION

This application claims priority to U.S. Provisional Application No. 63/730,947, filed on Dec. 11, 2024. The disclosure of the prior application is considered part of and is incorporated by reference in the disclosure of this application.

BACKGROUND

This specification relates to processing data using machine learning models.

Machine learning models receive an input and generate an output, e.g., a predicted output, based on the received input.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a method, implemented as a computer program on one or more computers in one or more locations, for generating multimodal data. A method of training a system for generating multimodal data items is also described.

In a first aspect there is described a method for generating multimodal data using a system comprising a token generation neural network and a media generation neural network. The method includes obtaining a multimodal input that comprises a set of one or more media items and one or more prompt tokens of a different modality; processing each of the one or more media items using a first media encoder neural network to generate a respective set of media tokens for each of the one or more media items; and generating an input sequence of multimodal tokens that comprises the prompt tokens and the media tokens for the one or more media items; processing the input sequence of multimodal tokens using the token generation neural network to generate an output sequence of multimodal tokens, comprising: determining that a criterion is satisfied as of a given multimodal token in the output sequence; and in response: processing each of the one or more media items using a second media encoder neural network to generate a respective encoded representation for each of the one or more media items; and generating an output media item using the media generation neural network conditioned on (i) features representing a current output sequence of multimodal tokens as of the given multimodal token obtained from the token generation neural network and (ii) the encoded representations of the one or more media items.

In some implementations, generating the output sequence of multimodal tokens comprises autoregressively, for each successive position in the output sequence of multimodal tokens: processing a combined sequence comprising the input sequence of multimodal tokens and a current output sequence of multimodal tokens, using the token generation neural network, to generate a next multimodal token for the output sequence of multimodal tokens, and appending the next multimodal token to the current output sequence of multimodal tokens.

In some implementations, determining that a criterion is satisfied as of a given multimodal token in the output sequence comprises determining that the next multimodal token is a start-of-media token.

In some implementations, the first media encoder neural network is different from the second media encoder neural network.

In some implementations, the first media encoder neural network is the second media encoder neural network.

In some implementations, processing the input sequence of multimodal tokens using the token generation neural network to generate an output sequence of multimodal tokens further comprises: processing the output media item to generate a sequence of media tokens; and appending the sequence of media tokens to the current output sequence of multimodal tokens as the next multimodal tokens in the output sequence of multimodal tokens after the given multimodal token.

In some implementations, processing the input sequence of multimodal tokens using the token generation neural network to generate an output sequence of multimodal tokens further comprises: continuing to generate, using the token generation neural network, further multimodal tokens after appending the sequence of media tokens to the current output sequence of multimodal tokens.

In some implementations, the token generation neural network comprises one or more self-attention neural network layers, the method further comprising applying a causal mask to the self-attention neural network layers whilst the self-attention neural network layers are processing the multimodal tokens, and using bi-directional attention whilst the self-attention neural network layers are processing the media tokens.

In some implementations, processing the output media item to generate a sequence of media tokens comprises processing the output media item using the first media encoder neural network to generate the sequence of media tokens.

In some implementations, the one or more prompt tokens comprise tokens representing one or more of text or audio data.

In some implementations, the output sequence of multimodal tokens comprises multimodal tokens representing text or audio data elements.

In some implementations, the media generation neural network is a diffusion neural network, and wherein generating the output media item comprises: initializing the media item or a latent representation thereof, by sampling values for elements of the media item or for the latent representation from a noise distribution; and at each of a series of time steps: determining an updated version of the media item or the latent representation thereof, by processing data specifying the time step, and the media item or the latent representation thereof, at the time step, using the media generation neural network conditioned on (i) the features representing a current output sequence of multimodal tokens as of the given multimodal token obtained from the token generation neural network and (ii) the encoded representations of the one or more tokens, to determine a reduced noise version of the media item or of the latent representation thereof.

In some implementations, the features representing the current output sequence of multimodal tokens as of the given multimodal token obtained from the token generation neural network comprise: i) respective output embeddings for at least a subset of the multimodal tokens in a current input sequence generated by a last attention layer block of the generative neural network by processing the current input sequence using the generative neural network, wherein the current input sequence comprises the current output sequence; ii) a respective output embedding for a predetermined additional token generated by the last attention layer block by processing an updated sequence that includes the predetermined additional token appended to the current input sequence using the token generation neural network; or iii) both.

In some implementations, the media generation neural network has been trained on a task that requires generating output media items conditioned on features generated by the token generation neural network while holding the token generation neural network fixed.

In some implementations, the media generation neural network has been pre-trained on a different media generation task prior to the training on the task that requires generating output media items conditioned on features generated by the token generation neural network.

In some implementations, the second media encoder neural network is trained jointly with the media generation neural network on the task that requires generating output media items conditioned on features generated by the token generation neural network while holding the token generation neural network fixed.

In some implementations, the second media encoder neural network is held fixed while the media generation neural network is trained on the task that requires generating output media items conditioned on features generated by the token generation neural network while holding the token generation neural network fixed.

In some implementations, the set of one or more media items comprises a plurality of media items.

In some implementations, the input sequence of multimodal tokens further comprises media tokens representing one or more additional media items and wherein the media tokens for the set of one or more media items follow the media tokens representing the one or more additional tokens in the sequence.

In some implementations, the one or more prompt tokens specify one or more edits to be applied to the one or more media items to generate the output media item.

In some implementations, the output media item is an image and wherein the media items in the set of one or more media items are images, videos, or audio samples.

In some implementations, the output media item is a video and wherein the media items in the set of one or more media items are images, videos, or audio samples.

In some implementations, the output media item is an audio sample and wherein the media items in the set of one or more media items are images, videos, or audio samples.

In another aspect, a method includes receiving a training example comprising a training input that comprises one or more prompt tokens and a ground truth media item; generating an input sequence that comprises the prompt tokens; processing the input sequence using a token generation neural network to generate features representing the input sequence; and training a media generation neural network on an objective that induces the media generation neural network to, when conditioned on a conditioning input comprising the features representing the input sequence, generate an output media item that matches the ground truth media item while holding the token generation neural network fixed.

In some implementations, the training input comprises one or more media items, the method further comprising: processing each of the one or more media items using a first media encoder neural network to generate a respective set of media tokens for each of the one or more media items, wherein the input sequence further comprises the media tokens for the media items.

In some implementations, the method further comprising: processing each of the one or more media items using a second media encoder neural network to generate a respective encoded representation for each of the one or more media items; and wherein the conditioning input comprises (i) the features representing the input sequence and (ii) the encoded representations of the one or more media items.

In some implementations, the media generation neural network has a U-net architecture comprising one or more cross-attention neural network layers, and wherein using the media generation neural network to generate the output media item comprises: using the one or more cross-attention neural network layers to attend to at least some of the features representing the current output sequence.

In some implementations, the output media item comprises an audio spectrogram; the method further comprising converting the audio spectrogram to time series audio data for an audio waveform.

In some implementations, the prompt tokens specify an edit to be applied to the one or more media items to generate the output media item.

In some implementations, the prompt tokens represent text or audio that defines an image generation task; and wherein the output media item is an image that defines a result of the task; in particular wherein: i) the task comprises generating an image specified by the prompt; or ii) the prompt includes an image and the task comprises generating a modified version of the image, where a modification to be performed is described by the prompt.

In another aspect, a method performed by one or more computers and for image, video or audio editing using a system comprising a token generation neural network and a media generation neural network comprises: obtaining a multimodal input that comprises a set of one or more media items, wherein the set of one or more media items are images, videos or audio samples, and one or more prompt tokens of a different modality that specify one or more edits to be applied to one or more of the set of one or more media items; processing each of the one or more media items using a first media encoder neural network to generate a respective set of media tokens for each of the one or more media items; generating an input sequence of multimodal tokens that comprises the prompt tokens and the media tokens for the one or more media items; processing the input sequence of multimodal tokens using the token generation neural network to generate an output sequence of multimodal tokens, comprising: determining that a criterion is satisfied as of a given multimodal token in the output sequence; and in response: processing each of the one or more media items using a second media encoder neural network to generate a respective encoded representation for each of the one or more media items; and generating an output media item using the media generation neural network conditioned on (i) features representing a current output sequence of multimodal tokens as of the given multimodal token obtained from the token generation neural network and (ii) the encoded representations of the one or more media items, wherein the generated output media item is an image, video or audio sample and is characterized by the task specified by the prompt tokens. For example, the generated output media item may be an image, video or audio sample that represents an image video or audio editing task performed on a respective one or more of the set of one or more media items of the multimodal input.

The task may specify a modification to a real-world object represented in one or more of the media items of the multimodal input. The task may specify the addition of a representation of a real-world object to one or more of the media items of the multimodal input. For example, the multimedia input may comprise a first media item representing a first real-world object and a second media item representing a second real-world object, and the output media item may represent both the first real-world object and second real-world object.

In another aspect, a system comprises: one or more computers; and one or more storage devices communicatively coupled to the one or more computers, wherein the one or more storage devices store instructions that, when executed by the one or more computers, cause the one or more computers to perform the operations of the respective method of any of the above aspects.

In another aspect, one or more computer storage media store instructions that when executed by one or more computers cause the one or more computers to perform the operations of the respective method of any of the above aspects.

The subject matter described in this specification can be implemented in particular embodiments so as to realize one or more of the following advantages.

Existing neural network systems that can generate media items, e.g., images, videos, or audio, can often generate high quality media items in response to text prompts that describe target properties of the media items. However, these systems often struggle when generating media items that need to incorporate specific context from one or more input media items, e.g., when performing editing tasks or other media item conditioned generation tasks. For example, image generation systems can struggle to generate output images that both (i) maintain specific details of the input image(s) while (ii) faithfully modifying the input image(s) as described in the text prompts.

This specification describes techniques that address these issues by incorporating a "latent passthrough" that provides the media item generation neural network with both (i) features generated by the token generation neural network and (ii) encoded representations of the input media item(s) generated by a media item encoder. As a result, the media item generation neural network can effectively incorporate details and other specific information from the input media item(s) into the output data item. Moreover, because the encoded representations are only provided when the input includes a media item (and not when the input includes only text, for example), the media item generation neural network can still effectively perform other tasks, e.g., tasks that require generating a media item from only a text input or other tasks that don't require generating a media item.

Moreover, implementations of the described techniques address the problem of "negative transfer." More specifically, when training a multi-modal model on multiple modalities of data, e.g., images and audio as well as text, training on these multiple modalities should not hinder but rather improve performance of each modality, i.e., relative to a single-modal model. In practice, however, "negative transfer" can occur and incorporating an additional modality into the training can hurt performance on other modalities.

Some implementations of the described system address this problem by offloading the media item generation to a separate model, in implementations a diffusion model, and by effectively training the system to avoid degrading performance of the token generation neural network on other tasks.

The media item generated using the described system is generated conditioned on features representing the current output sequence generated by the token generation neural network and encoded representations of one or more media items represented in the current input sequence. As such, the media item generation can be conditioned based on previously generated media items. This can achieve improved consistency for the generation of multiple media items. A series of media items (e.g., a plurality of media items in a set) may be generated which share consistency between each media item. For example, if a series of media items are generated all representing a particular location, each media item within the set may be consistent with other media items in the set, for example representing the same time of day, same weather, same subjects (e.g., same person, same classification of object etc.). Additionally, as described above, the subject matter described herein can be used to perform prompt-based image editing, e.g., where a series of output media items can be updated based on one or more text prompts.

In some implementations, after training, a particular task that is to be performed by the system can be described by the prompt to the system. For example, where the prompt includes an image such a prompt might specify "Remove the apple from the desk", "Make the apple blue", or "Generate a new image with the same background."

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
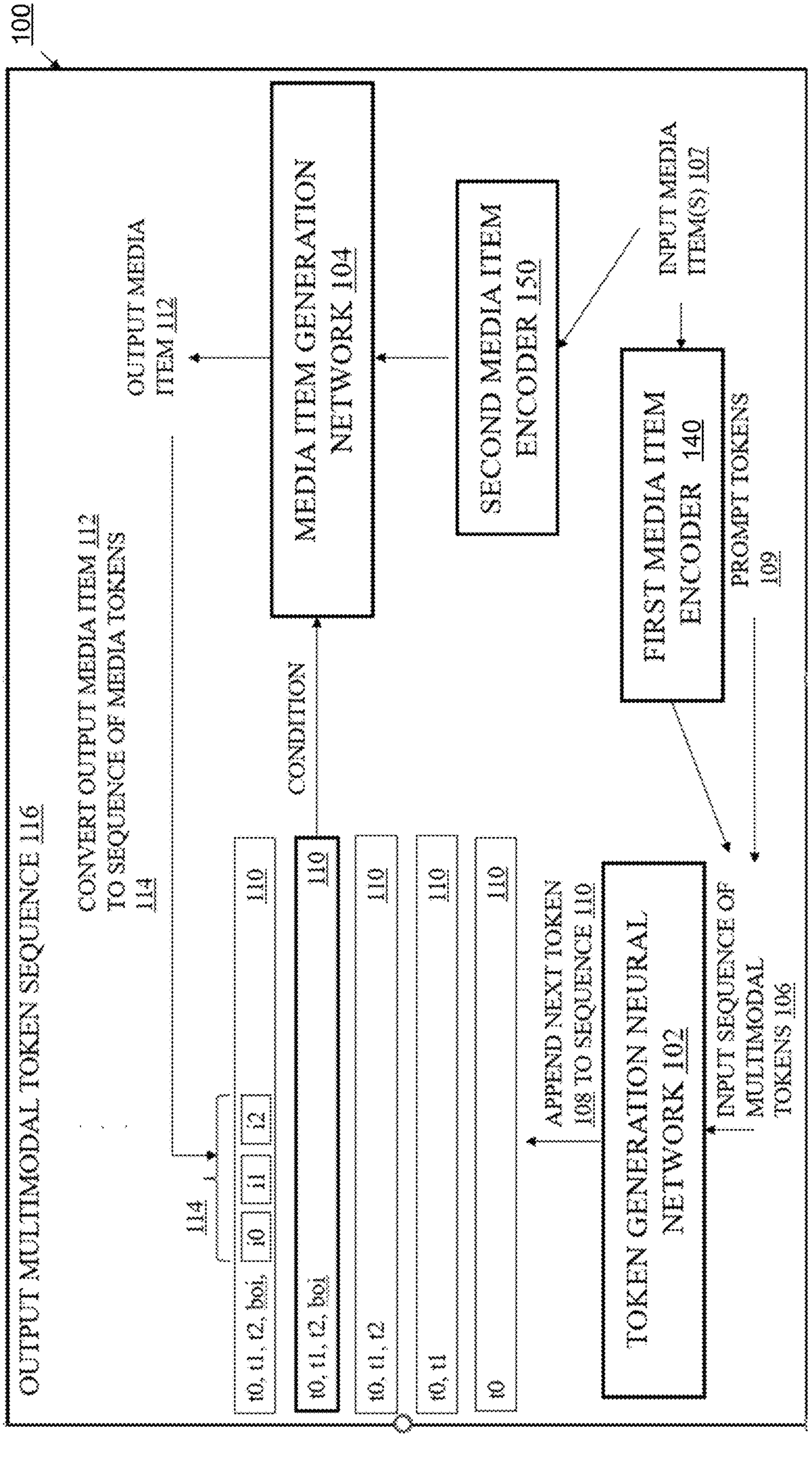
FIG. 1 shows an example system for generating multimodal data.

FIG. 1 shows an example generative system 100, implemented as computer programs on one or more computers in one or more locations, for generating multimodal data. More specifically, the system 100 can generate media items in response to multimodal inputs.

A "media item" as used in this specification can be an image, audio, video, text segment, or any other appropriate type of media of any appropriate modality.

"Modality" as used in this specification refers to a type of data.

Multimodal data is data that includes two or more different data types, for example data including two or more different data types from the following: text data, audio data such as speech data, in particular data defining an audio waveform, or image data, in particular data defining pixel values for pixels of a still or moving image.

Text data can represent text in a natural or computer language. The text may be received, e.g., as a series of encoded characters, e.g., UTF-8 encoded characters; such "characters" can include Chinese and other similar characters, as well as logograms, syllabograms and the like. The text can be processed to represent the text as a series of text tokens from a vocabulary of text tokens, e.g., that each represent words, wordpieces or characters in a natural or computer language. The computer language may be any formal language used to communicate with a computer, e.g., a markup language, or a command or configuration language, or a data exchange language such as JSON, or a programming language. There are many ways of representing text as a series of text tokens; one way is to use a text tokenizer.

A "token" as used in this specification is a data element, including a vector of numerical values and having a specified dimensionality. A multimodal token may represent a data element of one of a plurality of modalities (e.g., representing text, an image, audio). For a set of multimodal tokens, each token of the plurality of multimodal tokens may represent data elements of a respective one of a plurality of modalities (e.g., representing text, an image, or audio). As above, in general, each multimodal token may have the same dimensionality. Multimodal tokens may, therefore, refer to a plurality of tokens of a single modality from the plurality of modalities or to a plurality of tokens of two or more modalities from the plurality of modalities.

An image can be a still image or a moving image (e.g., a video), in 2D or 3D. The image may be associated with light in the electromagnetic spectrum, e.g., of optical light, of infrared light, or of ultraviolet light. The image may be monochrome, colour, or hyperspectral image, or a LIDAR image, in which case the "pixels" may comprise points of a point cloud. It is generally represented by values of pixels (more specifically voxels for a 3D image) of the image. The image may also be an audio spectrogram, i.e., an image of a time-frequency representation of the audio.

An image as described herein (whether during training or during inference) may be an image of a real-world environment, e.g., captured from the real-world by a camera or a microphone, or other image or audio sensor. Depending on the type of image captured, objects represented in the image may be physical real-world objects or real-world sounds (e.g., spoken words, the sound of thunder, the engine of a car or the bark of a dog). A real-world sound may originate from a physical, detectable object in the environment such as a weather phenomenon, an animal, a mechanical device etc.

The system 100 includes a token generation neural network 102 and a media generation neural network 104 that generates output media items. Depending on the type of media item being generated, the media item generation network 104 can be an appropriate media generation neural network for the media item type, i.e., an image generation neural network, an audio generation neural network, a video generation neural network, and so on. In some implementations, the system 100 maintains multiple different media generation neural networks 104 and can generate multiple different types of media data items using the appropriate media item generation neural network 104.

In operation, the system 100 obtains a multimodal input that includes a set of one or more media items 107 and one or more prompt tokens 109 of a different modality.

The prompt tokens 109 can be tokens of a single modality, e.g., representing only text data elements, or can be multimodal tokens representing a combination of two or more of: text, audio, or image data elements. The text data elements can be, e.g., words or wordpieces as previously described. The audio data elements can represent time segments of audio (e.g., an audio waveform). The image data elements can comprise pixel values for an image or a region (e.g., a patch) of an image.

Likewise, the output sequence of multimodal tokens 116 as described herein may comprise multimodal tokens representing a combination of two or more of: text, audio, or image data elements.

The system 100 processes each of the one or more media items 107 using a first media encoder neural network 140 to generate a respective set of media tokens for each of the one or more media items.

The first media encoder neural network 140 can generally be any appropriate encoder neural network that is configured to map a media item to a set of one or more tokens. Examples of such neural networks include recurrent neural networks, Transformers, vision Transformers, convolutional neural networks, or neural networks that include two or more of: recurrent layers, self-attention layers, and convolutional layers.

The first media item encoder neural network 140 can have been trained in any appropriate manner. For example, the neural network 140 can have been trained jointly with the token generation neural network, can have been pre-trained prior to the training of the token generation neural network, or can have been pre-trained and then fine-tuned jointly with the training of the token generation neural network. The pre-training can have been performed using any of a variety of representation learning objectives, e.g., one or more contrastive learning, generative pre-trained, masked reconstruction objectives, and so on. As a particular example, when the media items are images, the media item encoder neural network 140 can have been trained using a CoCa training technique (arXiv: 2205.01917), an ALIGN training technique (arXiv: 2102.05918), or a different appropriate representation learning technique.

The system then generates an input sequence 106 of multimodal tokens that includes the media tokens and the prompt tokens. In other words, the input sequence includes a plurality or multiplicity of tokens of different modalities, which are interleaved with respect to one another. The modalities may be any two or more of: text, audio, and/or image data elements. In general, the number of tokens of each modality may be different and so the interleaving of the tokens of different modality may not be a strict alternation. In more general terms, assuming the modalities of the tokens are type "A" (e.g., representing text) and "B" (e.g., representing an image or audio), the input sequence may alternate between patches or clusters of "A" type tokens and patches or clusters of "B" type tokens. A specific example of an input sequence of multimodal tokens may be "A, A, A, B, B, B, B, A, A, B, B, B, B".

In some implementations, the input sequence includes a "begin of image" or "start of image" (herein "boi") token to mark the beginning of one or more image tokens in the input sequence. In general, the "boi" token also marks or delineates a transition between a token of a first modality to a token of a second, different, modality (e.g., in-between tokens of "A" and "B" type). While these tokens are referred to as "boi" tokens for convenience, it will be understood that the token can be any appropriate start of "media" token, i.e., any appropriate token from the vocabulary that has been designated to indicate that tokens representing a media item follow or to designate a transition between two modalities of tokens.

In some implementations, the input sequence includes a "begin of sequence" (herein "bos") token, an "end of sequence" (herein "eos") token to mark the beginning and the end of the sequence, or both.

In some implementations the token generation neural network adds a token position encoding to each of the multimodal tokens (e.g., audio, image and/or text tokens) in the input sequence. Any appropriate position encoding can be used, e.g., relative position encoding, rotary position encoding (such as RoPE), or absolute position encoding.

The token generation neural network 102 is configured to process the input sequence of multimodal tokens 106 to generate an output sequence of multimodal tokens 116. The modalities of the output sequence may be any two or more of: text, audio, and/or image data elements. Each successive token 108 generated by the token generation neural network is appended to the current output sequence 110 of tokens (which may include multimodal tokens of a different or the same type).

In some implementations, the current output sequence 110 comprises an output token for each position in the output sequence preceding a position of the next multimodal token (e.g., representing text, image, or audio) to be predicted by the token generation neural network in the output sequence.

In some implementations, the token generation neural network 102 generates the output sequence of multimodal tokens by, autoregressively, for each successive position in the output sequence of multimodal tokens, processing a combined sequence comprising the input sequence of multimodal tokens and the current output sequence of tokens.

In some implementations, the token generation neural network 102 autoregressively generates a plurality of text tokens (denoted t0, t1, t2 in FIG. 1) before autoregressively generating a "boi" token. It will be understood that, in some implementations, the first token autoregressively generated by the token generation neural network may be a "boi" token.

The media item generation neural network 104 is configured to generate an output media item in response to the token generation neural network autoregressively generating an "boi" token or in response to a different criterion being satisfied. That is, the media item generation neural network is triggered to generate an output media item conditional upon the token generation neural network generating a "boi" token or upon a different appropriate criterion being satisfied. The output media item generated is conditioned on features representing the current output sequence of the tokens obtained from the token generation neural network, which are dependent on the media tokens generated by the first media encoder neural network. The media item generation neural network can comprise, e.g., a diffusion model or an autoregressive model, conditioned on features representing the current output sequence.

In a specific implementation, the features used to condition the image generation subsystem are determined from the output features of the "boi" token, which are used to generate a summary multimodal token. The "boi" token is a convenient choice for generating the summary multimodal token because, as the token generation neural network generates successive tokens autoregressively, it already represents or provides a summary of all preceding tokens generated by the token generation neural network and because it has no target text token to predict. This means that the values for the output features of the "boi" token can be assigned or otherwise processed during training.

Alternative implementations for generating the summary multimodal token are envisaged, e.g., in which all preceding tokens (or all preceding tokens before a start of sentence token) generated by the token generation neural network 102 are used to generate the summary multimodal token. This may involve pooling features (e.g., mean pooling or max pooling) from the output features from the preceding tokens in the current output sequence. In yet further implementations, a combination of pooled features and the features derived from the "boi" token can be used for generating the summary multimodal token for conditioning the media item generation.

In addition to the features generated by the token generation neural network, the system 100 also generates an additional conditioning input for conditioning the media item generation.

In particular, the system 100 processes each input media item 107 using a second media item encoder neural network 150 to generate a respective encoded representation for each of the one or more media items. The encoded representation of a given media item is generally a collection of numerical values, e.g., a set of one or more vectors of numerical values, that represent the given media item. For example, the encoded representation can include one or more tokens that are the same dimensionality or a different dimensionality from the multimodal tokens.

The second media encoder neural network 150 can generally be any appropriate encoder neural network that is configured to map a media item to an encoded representation, i.e., to a set of one or more tokens. Examples of such neural networks include recurrent neural networks, Transformers, vision Transformers, convolutional neural networks, or neural networks that include two or more of: recurrent layers, self-attention layers, and convolutional layers.

In some implementations, the first media encoder neural network 140 and the second media encoder neural network 150 are the same neural network. In other implementations, the first media encoder neural network 140 and the second media encoder neural network 150 are different neural networks. That is, in these implementations, the second encoder 150 has a different architecture from the first encoder 140, has been trained differently than (and therefore has different parameters than) the first encoder 140, or both.

The second media item encoder neural network 150 can have been trained in any appropriate manner. As a particular example, the second encoder 150 can have been trained jointly with a media item decoder neural network on a media item reconstruction objective, e.g., as part of a variational auto-encoder framework. Examples of such frameworks include the vector quantization-variational auto-encoder (VQ-VAE) framework and the vector quantization generative adversarial network (VQGAN) framework. In some cases, the second encoder 150 can then be fine-tuned to improve performance. Examples of this fine-tuning are described below.

The system 100 then generates an output media item using the media generation neural network conditioned on (i) features representing the current output sequence of multimodal tokens as of the given multimodal token obtained from the token generation neural network and (ii) the encoded representations of the one or more media items. Thus, although the features generated by the token generation neural network are conditioned on the media tokens, the system 100 also provides a "pass-through" by way of the encoded representations, allowing the media generation neural network to more effectively incorporate context and details from the input media items.

In some implementations, the system is configured to process the output media item generated by the neural network 104 to convert the output media item into a sequence of media tokens 114. For example, the system can process the output media item using the first media encoder neural network 140 to generate the sequence of media tokens 114.

The system is then configured to append (i.e., immediately after the "boi" token) the sequence of image tokens 114 to the current output sequence 110 of tokens as the next tokens in the output sequence of multimodal tokens.

In some implementations, the token generation neural network 102 is configured to continue processing a combined sequence, comprising the input sequence of multimodal tokens and the current output sequence of multimodal tokens to generate or cause to generate further tokens for appending to the output sequence of multimodal tokens. The further tokens may include text tokens, "boi" tokens, media tokens generated from further media items generated by the media generation neural network 104 in response to the token generation neural network generating a "boi" token, or an "eos" token. The "eos" token is the final token of the output multimodal token sequence.

For example, the system can continue performing the above steps to generate additional media items after generating the output media item 112. In this case, when generating any given subsequent media items, the input sequence of multimodal tokens further includes additional media tokens representing one or more additional media items, i.e., the output media item 112 and any other output media items, and the media tokens for the set of one or more media items 107 follow the media tokens representing the one or more additional media items in the sequence.

In some other implementations, the token generation neural network 102 can stop processing once the output media item 112 has been generated and can provide the output media item 112 for presentation to a user.

In some implementations, the multimodal data of the input and output sequence comprises audio data. Audio data, which may represent spoken words or another sound originating from an object, can comprise values of an audio waveform, e.g., instantaneous amplitude values of the waveform. Audio data can be represented as a spectrogram (i.e., an image of a time-frequency representation of the instantaneous amplitudes of the audio waveform). That is, in some implementations, the image comprises an audio spectrogram.

In such implementations, the system is configured to convert the audio spectrogram to time series audio data for an audio waveform. The spectrogram can be, e.g., a mel-spectrogram. The time series audio data for the audio waveform can represent instantaneous amplitude values of the audio waveform. The audio waveform may comprise a waveform of speech in a natural language. The audio waveform may comprise a waveform of a sound made by a real-world object.

As a spectrogram is a form of image, the image generation subsystem should not be interpreted to be limited to only outputting images associated with a particular frequency range of the electromagnetic spectrum (e.g., of optical light, of infrared light, of ultraviolet light, etc.). That is, the image generation subsystem may generate an image representing an audio data (in the form of a spectrogram), which is then block encoded into image tokens (e.g., one or more audio tokens) as described above.

The token generation neural network can be a Transformer neural network, e.g., a so-called decoder-only Transformer neural network, i.e., a neural network characterized by having a succession (e.g., one or more) of self-attention neural network layers. An example transformer model is described in Vaswani, et al., (arXiv: 1706.0372). More specifically, the neural network can include one or more transformer layer blocks. A transformer layer block, as used in this specification, is a collection of one or more attention neural network layers.

For example, the one or more neural network layers in the transformer layer block can include one or more attention or self-attention neural network layers that each use an attention mechanism to apply an attention or self-attention operation; these may be followed by a feedforward neural network layer.

In some implementations, the token generation neural network 102 may comprise one or more self-attention neural network layers. A self-attention neural network layer has an attention layer input for each element of the input and is configured to apply an attention mechanism over the attention layer input to generate an attention layer output for each element of the input. There are many different attention mechanisms that may be used. For example, a self-attention operation can be one that applies an attention mechanism to elements of an embedding (a representation of an entity as an ordered collection of numerical values), to update each element of the embedding. For example, an input embedding can be used to determine a query vector and a set of key-value vector pairs, and the updated embedding can comprise a weighted sum of the values, weighted by a similarity function of the query to each respective key.

Generally, to apply the self-attention operation in an attention layer, each attention mechanism uses one or more attention heads. Each attention head generates a set of queries, a set of keys, and a set of values, and then applies any of a variety of variants of query-key-value (QKV) attention, e.g., a dot product attention function or a scaled dot product attention function, using the queries, keys, and values to generate an output.

As a particular example, in an attention head of a self-attention neural network layer, the attention mechanism may be configured to apply each of a query transformation, a key transformation, and a value transformation, to the attention layer input for each embedding of an input sequence X to derive a respective query vector, key vector, and value vector which are used to determine the updated embedding. The query, key, and value transformations can be any respective linear transformations or any other appropriate learned transformation. For example, the attention head can generate an updated embedding for each input position computing a weighted sum of the values, weighted by a similarity function of the query for the input position to the corresponding key. The similarity function may comprise, e.g., a dot product, cosine similarity, or other similarity measure.

When the attention head uses position encoding, the application of the dot product attention function, the computation of the queries, keys, and values, or both depend on the relative or absolute positions of the embeddings corresponding to the queries, keys, and values within the input sequence.

For example, an implementation of RoPE can involve determining, for a given query at a respective input position, a query rotation matrix that represents the absolute or relative position of the respective input position of the query, e.g., an index of the input position in the sequence; determining, for a given key at a respective input position, a key rotation matrix that similarly represents the absolute or relative position of the respective input position of the key, e.g., an index of the input position in the sequence, and multiplicatively combining the query rotation matrix, the key rotation matrix, the query (vector), and the key (vector), to determine a weight value between the query and the key that is dependent on a relative distance between the position corresponding to the key and the position corresponding to the query.

As another example, an implementation of ALiBi can involve adding a linear bias matrix to a weight determined from a combination of the key and the query.

When the attention head does not use position encoding, both the application of the dot product attention function and the computation of the queries, keys, and values, are independent of the relative or absolute positions of the embeddings corresponding to the queries, keys, and values within the input sequence.

Each query, key, value can be a vector that includes one or more vector elements. When there are multiple attention heads, the attention block then combines the outputs of the multiple attention heads, e.g., by concatenating the outputs and, optionally, processing the concatenated outputs through a linear layer.

For local attention mechanisms, for each position, the positions that are used to generate the queries, keys, and values for the position are defined by the local window size for the local attention mechanism, i.e., non-zero attention weights for a given position are computed only for positions that are within the local window of the given position.

In some cases, because the attention applied by the attention layers is causal (for at least some of the tokens in the input sequence), the system can store, for any given attention mechanism and when generating the output for any given input position, the embeddings or the keys and values already computed for earlier input positions steps rather than re-computing the embeddings (or the keys and values) for earlier time steps.

Thus, in these cases, updating the respective embeddings for each of the input positions by applying an attention mechanism to the respective embeddings refers to updating the respective embedding for the last input position in the current input sequence using keys and values or embeddings for the other input positions that have been retrieved from memory (e.g., from a "cache"). Storing keys and values in a memory for later re-use can be referred to as storing the keys and values in a "KV cache."

In some implementations, some, or all of the layer blocks in the neural network can include other types of layers in addition to attention layers, e.g., normalization layers, residual connection layers, feedforward layers, and so on.

At inference time, the transformer can operate in an autoregressive mode.

In the autoregressive mode, the transformer generates an output sequence of tokens by, at each of multiple time steps, processing the most recently generated token in the output sequence to generate a new output token to be added to the output sequence.

In some implementations, as will be described in more detail below, the token generation neural network can apply a causal mask to the self-attention neural network layers whilst the self-attention neural network layers are processing the multimodal tokens, and use bi-directional attention whilst the self-attention neural network layers are processing the media tokens. "Bi-directional attention" refers to, for any given media item, allowing each media token to attend to all other media tokens representing the same media item. This is in contrast to causal masking, where each media token would be prevented from attending to any media tokens representing the same media item but that are after the media token in the input sequence.

In some implementations the media item generation neural network subsystem comprises a diffusion model generation subsystem. That is, the output data item is generated by sampling values for the entries of the output data item, e.g., pixels of the image, or for the latent vector representation thereof, from a noise distribution. Generating the output data item then comprises initializing the output data item or a latent vector representation thereof, by sampling values for the pixels of the output data item or for the latent vector representation from a noise distribution.

Generating the output data item can also comprise performing a denoising process across a series of time steps, determining an updated version of the image or the latent vector representation thereof (for example, by processing the time step, and the image or the latent vector representation thereof, at the time step), and using the image generation neural network, conditioned on the features representing the current output sequence of multimodal tokens and the encoded representations of the one or more media items, to determine a reduced noise version of the image or of the latent vector representation thereof. An example of implementing the diffusion model in latent variable space is described in arXiv: 2112.10752.

While the model is referred to as a "diffusion model," it should be understood that this can refer to any appropriate model that can perform a denoising process to denoise from the noisy representation, e.g., a latent diffusion model, a rectified flow model, a multi-step consistency model, and so on. As such, generating the output data item can include determining a refined version of the image or of the latent vector representation thereof, rather than specifically a reduced noise version. The refined version may be a reduced noise version, or it may be another transformed version depending on the model used. For example, the refined version may be a transformation of the image or its latent vector representation along a trajectory or flow field used by a flow model.

Where a moving image is to be generated using a diffusion model, this can be done in various ways. As one example the temporal axis can be treated as an extra spatial dimension. As another example a technique such as that described in arXiv: 2402.09470 can be used.

The media item generation neural network can be conditioned on the encoded representations and the features in any of a variety of ways. For example, in some implementations, the media item generation neural network has a U-net architecture. In general, a U-Net architecture maps an input of a given dimensionality to an output of the same dimensionality. The U-net architecture (or other appropriate architecture) has one or more cross-attention neural network layers. In implementations, using the image generation subsystem to generate the predicted image conditioned on features representing the current output sequence and the encoded representations, includes using the one or more cross-attention neural network layers to attend to features of the current output sequence obtained by processing the current output sequence (e.g., the "boi" token) using the token generation neural network and to the encoded representations.

A cross-attention neural network layer can be similar to the above described self-attention neural network layer, but with the query derived from one embedding and the keys and values from a different embedding. For example, the queries can be obtained from features generated by the U-Net and the keys and values can be obtained from the features of the current output sequence, the encoded representations, or both.

In some implementations, e.g., where the token generation neural network has a Transformer neural network architecture, the features of the current output sequence may comprise, e.g., features of a final self-attention neural network layer of the token generation neural network, or features of a subsequent linear layer, or features of a subsequent softmax layer ("soft tokens").

In some implementations, as each successive multimodal token is generated, features, and in particular output features, of the token may be cached for later use in by the cross-attention neural network layer.

Example tasks that can be implemented by the system 100 are now described.

The task may include generating an image specified by the prompt conditioned on an input image.

Thus, the prompt may include an image. The task may include generating a modified version of the image. A modification to be performed may be described by the prompt.

In general, the task may be an image or audio editing, modification or processing task. The multimodal input sequence 106 may include one or more images, videos or audio samples or representations thereof. The multimodal input sequence may also include one or more prompt tokens which specify the task to be performed. As such, generating an output media item 112 using the media item generation network 104 can be conditioned on the one or more input images, videos or audio samples and the task specified by the prompt. Thereby, the output media item represents a modified version of the input media item, wherein the modification is characterized by the prompt in the input sequence. The edit, modification or processing may be the modification of, addition of, or removal of, a representation of a real-world object from the one or more media items. In one implementation the multimodal input sequence includes an audio sample representing a spoken utterance and a car engine, and a prompt which specifies removing sound associated with the car engine from the audio sample, such that the output comprises an audio sample including the spoken utterance in isolation. In another implementation the multimodal input sequence includes a first image including a representation of a person and second image representing a jacket and a prompt specifying editing the first image to include the person wearing the jacket of the second image. In another implementation the multimodal input sequence includes a video showing heart activity and a prompt specifying the addition of annotations indicative of cardiovascular events and possible interpretations, and the output media item comprises an annotated video.

In some implementations, the prompt sequence may include text or audio that defines an image generation task or image processing task. The image may define a result of the task. The task may include generating an image specified by the prompt.

The prompt may include an image and the task may include generating an edited version of the image, where an edit to be performed is described by the prompt.

Figure 2:
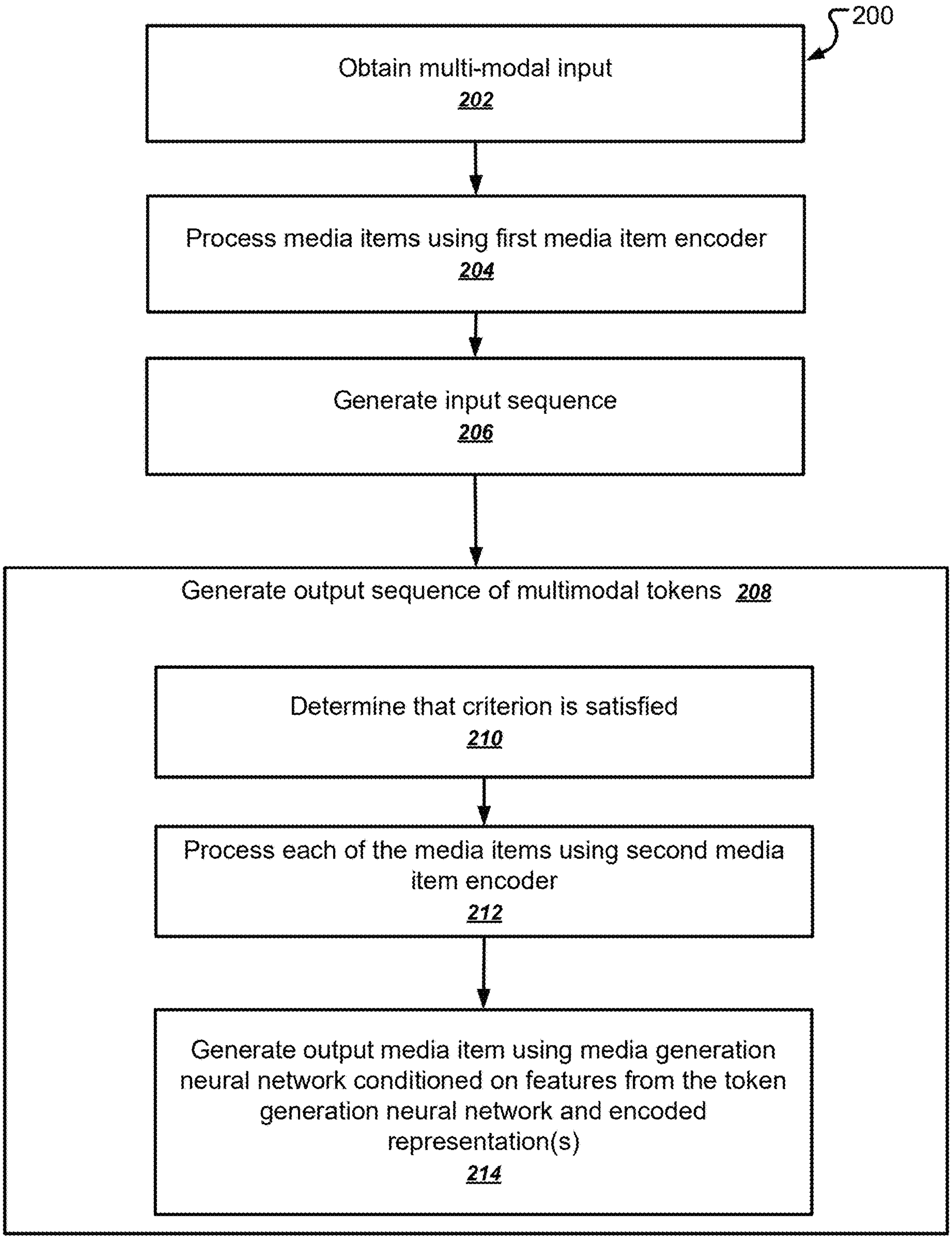
FIG. 2 is a flow diagram of an example process for generating multimodal data.

FIG. 2 is a flow diagram of an example process 200 for generating multimodal data. The process of FIG. 2 may be implemented by one or more computers in one or more locations, for example the system shown in FIG. 1.

In particular, the system obtains a multimodal input that includes a set of one or more media items and one or more prompt tokens of a different modality (step 202).

The system processes each of the one or more media items using a first media encoder neural network to generate a respective set of media tokens for each of the one or more media items (step 204).

The system generates an input sequence of multimodal tokens that includes the prompt tokens and the media tokens for the one or more media items (step 206).

The system processes the input sequence of multimodal tokens using the token generation neural network to generate an output sequence of multimodal tokens (step 208).

As part of this, the system determines that a criterion is satisfied as of a given multimodal token in the output sequence (step 210). That is, the system can begin generating multimodal tokens autoregressively and then determine that the criterion is satisfied as of a certain token.

For example, the system can determine that the criterion is satisfied when the next multimodal token is a start-of-media token. As another example, the system can determine that the criterion is satisfied when the preceding multimodal tokens specify a function call to a media generation function.

In response to determining that the criterion is satisfied as of the given multimodal token in the output sequence, the system processes each of the one or more media items using a second media encoder neural network to generate a respective encoded representation for each of the one or more media items (step 212).

The system then generates an output media item using the media generation neural network conditioned on (i) features representing a current output sequence of multimodal tokens as of the given multimodal token obtained from the token generation neural network and (ii) the encoded representations of the one or more media items (step 214).

Thus, to improve the ability of the media generation neural network to effectively condition on the one or more media items, although the features representing the current output sequence incorporate information about the one or more media items (because the current output sequence includes the media tokens representing the one or more media items), the system provides a "latent passthrough" that directly provides the encoded representations of the one or more media items as input to the media generation neural network.

Figure 3:
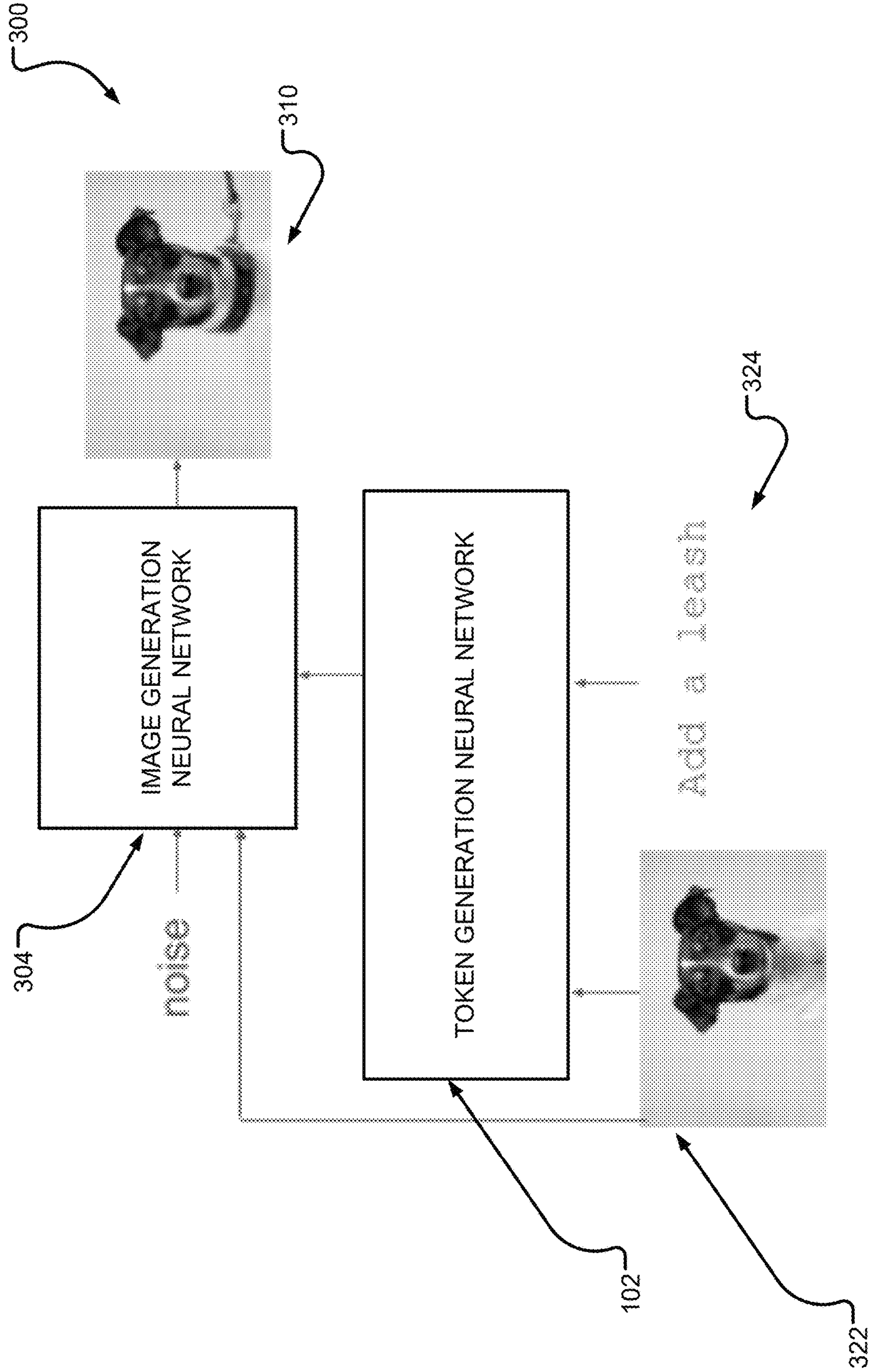
FIG. 3 shows an example of the operation of the system.

FIG. 3 shows an example 300 of the operation of the system 100 in generating an output image 310.

That is, in the example 300, the media item being generated is an output image. Thus, in the example 100, the system 100 includes the token generation neural network 102 and an image generation neural network 304.

In the example 300, the system 100 receives a multimodal input that includes an input image 322 of a dog and a set of prompt tokens representing a prompt input 324. In this example, the prompt input 324 is a text prompt that requests an edit to the input image ("add a leash").

The system 100 processes the multimodal input to generate an input sequence of multimodal tokens representing the multimodal input. In particular, the system 100 processes the text prompt 324 using a text tokenizer to generate the prompt tokens and processes the input image 322 to generate a set of image tokens representing the input image 322.

The system 100 processes the input sequence of multimodal tokens using the token generation neural network 102 to generate features representing a current output sequence of multimodal tokens as of a given multimodal token.

The system 100 also processes the input image 322 using a second image encoder neural network to generate an encoded representation of the input image.

The system 100 then generates the output image 310 using the image generation neural network 304 conditioned on (i) features representing a current output sequence of multimodal tokens as of the given multimodal token and (ii) the encoded representation of the input image 322.

In the example 300, the image generation neural network 304 is a diffusion model and the neural network 304 therefore also receives noise that is used to initialize the representation of the output image in order to perform the denoising process.

Figure 4:
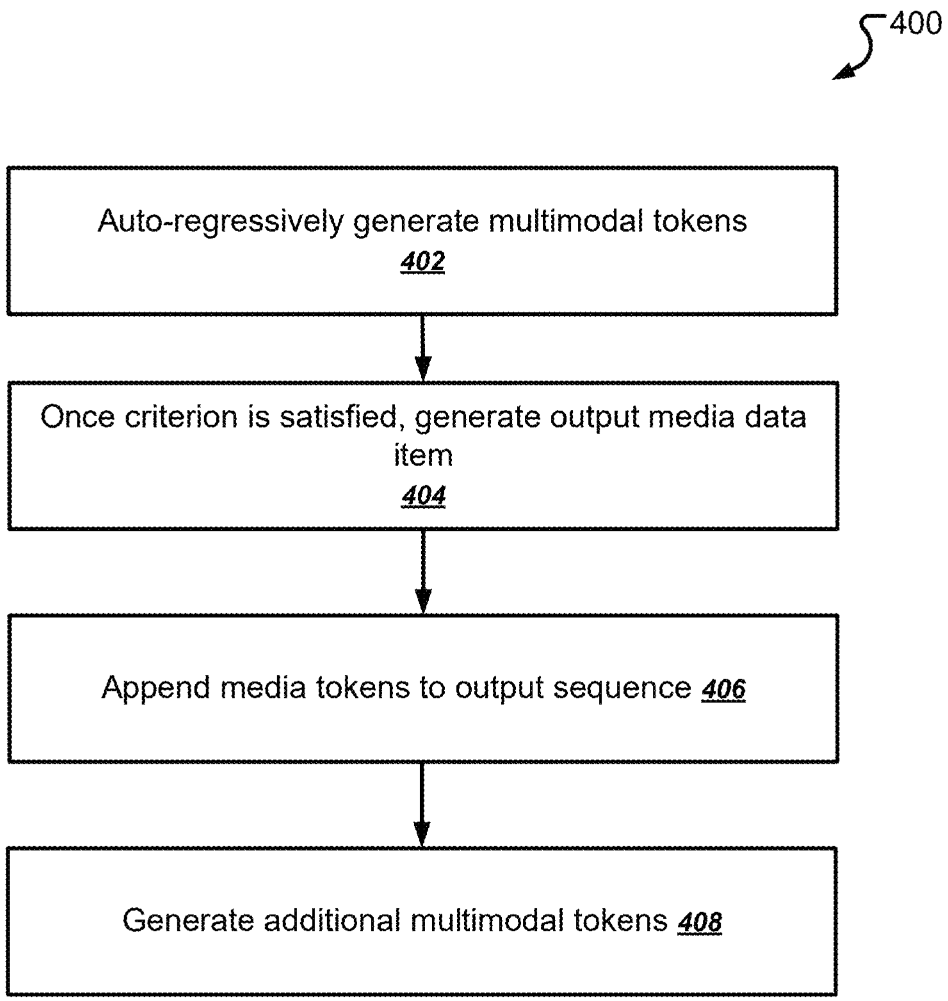
FIG. 4 is a flow diagram of another example process for generating multimodal data

FIG. 4 is a flow diagram of another example process 400 for generating the output sequence of multimodal tokens. For convenience, the process 400 will be described as being performed by a system of one or more computers located in one or more locations. For example, a generative system, e.g., the generative system 100 of FIG. 1, appropriately programmed in accordance with this specification, can perform the process 400.

The system auto-regressively generates one or more multimodal tokens by processing the input sequence (step 402). That is, as described above, the system continues auto-regressively generating multimodal tokens until the criterion is satisfied.

Once the criterion is satisfied, the system generates an output media item using the media item generation neural network as described above (step 404).

The system then processes the output media item using the first media encoder neural network to generate a set of media tokens representing the output media item.

The system appends the media tokens representing the output media item to the output sequence of multimodal tokens (step 406).

The system continues generating additional multimodal tokens (step 408). For example, the system can continue generating these tokens until an end of sequence token is generated. The additional tokens that are generated can include auto-regressively generated multimodal tokens, media tokens generated using the media generation neural network, or both. Thus, by repeatedly performing the process 300, the system can generate multiple media items as part of generating a given multimodal output sequence.

In some cases, when the current input sequence at any given time that the criterion is satisfied includes multiple media items, the system can condition the media item generation neural network only on a proper subset of the most recent media items in the sequence. A "proper" subset is a subset that includes less than all of the media items in the sequence. This can preserve the computational efficiency of the generation process and avoid providing the media generation neural network with irrelevant context.

Figure 5:
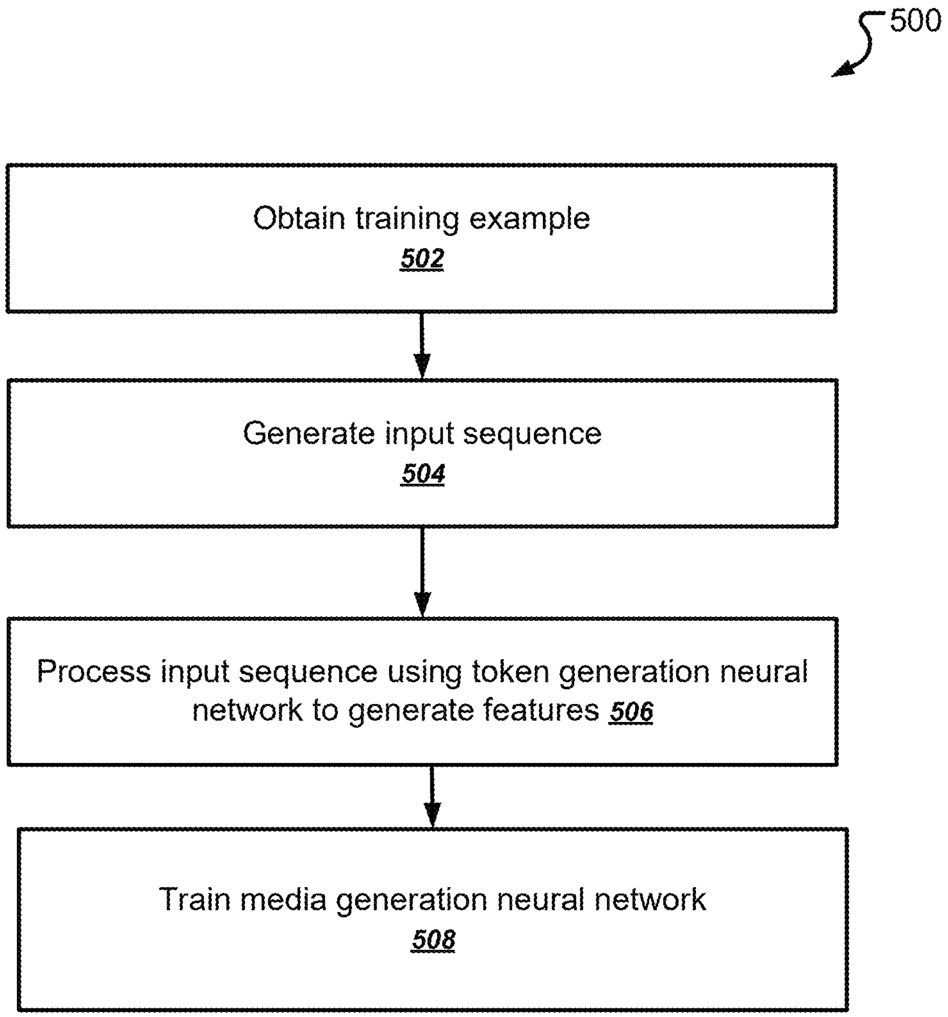
FIG. 5 is a flow diagram of an example process for training the media generation neural network.

FIG. 5 is a flow diagram of an example process 500 for training the media generation neural network. For convenience, the process 500 will be described as being performed by a system of one or more computers located in one or more locations. For example, a training system appropriately programmed in accordance with this specification, can perform the process 500.

Generally, the media generation network can, prior to use by the generative system 100, have been trained using any of a variety of training paradigms.

As one example, the media generation neural network can have been trained on a task that requires generating output media items conditioned on features generated by the token generation neural network while holding the token generation neural network fixed.

In some of these examples, the media generation neural network can have been pre-trained on a different media generation task prior to the training on the task that requires generating output media items conditioned on features generated by the token generation neural network. For example, this pre-training can be on unconditional or text-conditional media item generation tasks. Examples of training for such generative tasks are provided below.

In some of these examples, the second media encoder neural network is trained jointly with the media generation neural network on the task that requires generating output media items conditioned on features generated by the token generation neural network while holding the token generation neural network fixed. For example, this can be done after pre-training the second media encoder neural network as described above.

In others of these examples, the second media encoder neural network is held fixed while the media generation neural network is trained on the task that requires generating output media items conditioned on features generated by the token generation neural network while holding the token generation neural network fixed. That is, the second media encoder neural network is pre-trained and then held fixed while the media generation neural network is trained on the task that requires generating output media items conditioned on features generated by the token generation neural network. For example, the second media encoder neural network can be pre-trained on a reconstruction objective as described above.

In yet other examples, the token generation neural network can be fine-tuned on the media generation task while holding both the second media encoder neural network and the media generation neural network fixed after both the media generation neural network and the second media encoder neural network have been pre-trained independently from the token generation neural network.

In particular, the process 500 describes an example of training the media generation neural network on the task that requires generating output media items conditioned on features generated by the token generation neural network.

The system receives a training example that includes a training input that comprises one or more prompt tokens and a ground truth media item (step 502). In some cases, the training example also includes one or more input media items.

The system generates an input sequence that includes the prompt tokens (step 504). When the training example also includes one or more input media items, the system processes each of the one or more media items using a first media encoder neural network to generate a respective set of media tokens for each of the one or more media items. In this case, the input sequence also includes the media tokens for the input media items.

The system processes the input sequence using a token generation neural network to generate features representing the input sequence (step 506), e.g., as described above with reference to FIG. 1.

The system trains a media generation neural network on an objective that induces the media generation neural network to, when conditioned on a conditioning input that includes the features representing the input sequence (and, when used, the respective encoded representation for each of the one or more media items), generate an output media item that matches the ground truth media item while holding the token generation neural network fixed (step 508). Examples of specific objectives are described below.

An example of generating the output media item when the output media item is an image and when the media item generation neural network is a diffusion model will now be described.

At each of one or more updating iterations, the diffusion model processes a diffusion input for the updating iteration, that includes a current noisy data item for the updating iteration, to generate a denoising output. At the first time step, the current noisy data item is an initial noisy data item. At each updating iteration, the denoising output generated by the diffusion neural network is used to update the current data item as of the updating iteration, generating an updated current data item. The current noisy data item corresponds to the updated noisy data item generated in the preceding iteration. In this manner, the diffusion neural network is used to perform a reverse diffusion process across one or more updating iterations to generate the output data item.

A trained diffusion neural network can, at any given updating iteration, process a diffusion input for the updating iteration that includes a current data item (as of the updating iteration) to generate a denoising output for the updating iteration. In some implementations, the denoising output is an estimate of the noise component of the current data item, i.e., the noise that needs to be combined with the output data item to generate the current data item. In some other implementations, the denoising output is an estimate of the output data item given the current data item, i.e., an estimate of the data item that would result from removing the noise component of the current data item.

It will be understood that the diffusion model can have any appropriate architecture that allows the neural network to map a diffusion input that includes a noisy data item to a denoising output. For example, the diffusion model can have one or more further levels, including one or more transformer neural networks and/or convolution neural networks.

For example, the diffusion model can be configured as a conditional model that generates a denoising output conditioned on a conditioning input. As mentioned above, the conditioning input includes features representing the current output sequence of multimodal tokens obtained from the token generation neural network (and which includes the "boi" token) and the encoded representations of the one or more media items. That is, the diffusion model is configured to generate an output image that has features characterised by the conditioning input.

More generally, the conditioning input can include or represent one or more different types of inputs of one or more different modalities, e.g., any combination of text, audio, and image data elements. In some implementations, the conditioning input can include one or more images, or other sensor data, captured from a real-world environment.

The diffusion model neural network can be conditioned on the conditioning input (e.g., the features representing the current output sequence of multimodal tokens obtained from the token generation neural network and the encoded representations of the one or more media items) in any of a variety of ways.

For example, the noisy data item may be concatenated or otherwise combined with the conditioning input and processed by the input layer of the diffusion model neural network. For example, the diffusion input may comprise multiple channels, with the initial values for one or more channels being taken from the conditioning input and the initial values for the remaining one or more channels being the noisy data item. The diffusion input may be generated by concatenating a noisy data item with the conditioning input along the channel dimension. Alternatively, the diffusion input may be generated by including one or more conditioning embeddings generated from the conditioning input at some positions in the diffusion input, and including one or more embeddings from the noisy data item at the remaining positions.

The conditioning input may be taken as input to one or more intermediate layers of the diffusion model neural network or the final layer of the diffusion model neural network for example. The conditioning input may be combined with the output of one or more layers of the diffusion model neural network, and the result processed by the subsequent layer of the diffusion model neural network.

For example, the conditioning input may be incorporated by one or more cross-attention layers of the model. That is, the diffusion model can include one or more cross-attention layers that each cross-attend into the one or more embeddings. Each of the one or more cross-attention neural network layers can be similar to a self-attention neural network layer, but with the query derived from one embedding and the keys and values from a different embedding. For example, the queries can be obtained from features generated by the U-Net and the keys and values can be obtained from the features of the current output sequence. An embedding, as used in this specification, is an ordered collection of numerical values, e.g., a vector of floating point values or other types of values.

The diffusion model input at any given updating iteration can also include data defining a noise level for the iteration. Generally, each updating iteration has a corresponding time step t and the noise level for the iteration depends on the time step. For example, the noise level can be a decreasing function of the time step t. Examples of such functions include a linear function, a cosine function, and a sigmoid function. In these cases, data identifying the noise level, the time step, or both can be embedded using an appropriate neural network, e.g., a multi-layer perceptron (MLP) and used to condition the diffusion neural network, as described above for the conditioning input for example.

In some implementations, the noisy data item may be initialised, i.e., the first instance of the noisy data item can be generated, by sampling a value for each element in the data item from a corresponding noise distribution, e.g., a Gaussian distribution or a different noise distribution. For example, the initial noisy data item may be generated by sampling initial numerical values for each of multiple embeddings included in the initial noisy data item from a corresponding noise distribution, e.g., a Gaussian distribution or another predetermined distribution. The initial noisy data item therefore includes the multiple embeddings, with the initial values for each embedding being sampled from a corresponding noise distribution.

When configured as a conditional model, the diffusion model input for the first updating iteration comprises the initial noisy data item and the conditioning input, and may further comprise data defining a noise level for the iteration. The output data item is then generated by updating the noisy data item at each of a plurality of updating iterations. In other words, the output data item is the data item after the last iteration of the plurality of updating iterations. The noisy data item at the first updating iteration is the initial noisy data item.

When configured as a conditional model, the diffusion model input for each subsequent updating iteration comprises the current noisy data item and the conditioning input, and may further comprise data defining a noise level for the iteration. An updated current noisy data item is generated in each updating iteration. The current noisy data item corresponds to the updated noisy data item generated in the preceding iteration.

At each updating iteration, the denoising output generated by the diffusion neural network is used to update the current data item as of the updating iteration, generating an updated current data item. For example, the system can determine an initial estimate of the output data item using the denoising output and then apply an appropriate diffusion sampler to the initial estimate to update the current data item. For example, when the denoising output is a prediction of the output data item, the denoising output can be directly used as the initial estimate. When the denoising output is a prediction of the noise component, the initial estimate can be determined from the current data item, the denoising output, and the noise level for the current updating iteration. Any appropriate diffusion sampler may be used to update the current noisy data item, e.g., the DDPM (Denoising Diffusion Probabilistic Model) sampler, the DDIM (Denoising Diffusion Implicit Model) sampler or another appropriate sampler, to the estimate to generate the updated current data item. DDPMs are, for example, discussed in Ho, et al., arXiv: 2006:11239.

After the last updating iteration, the updated current data item may be taken as the output data item. Optionally, after the last iteration, the initial estimate may be directly taken as the updated current data item (without use of a sampler).

In some implementations, the number of updating iterations is fixed. In other cases, the number of iterations may be adjusted based on a latency requirement for the generation of the output data item, i.e., the number of iterations is selected so that the output data item will be generated to satisfy the latency requirement. In yet other cases, the number of iterations may be determined based on a computational resource consumption requirement for the generation of the output data item. For example, the requirement can be a maximum number of floating operations (FLOPS) to be performed as part of generating the final output data item.

As described above, a reverse diffusion process is performed across the updating iterations by updating the current data item at each iteration. Each updating iteration corresponds to a different time point in a time interval, e.g., the interval between zero and one, or another appropriate time interval. The time point is also referred to as a time step t or a time index t. For example, the updating iterations can be evenly spaced across the time interval, i.e., at regular intervals within the interval, or can be arranged within the time interval according to a different scheme.

For the first updating iteration, the current data item is the noisy initial data item. For each subsequent updating iteration, the current data item is the data item after being updated at the preceding updating iteration, i.e., the updated current data item from the preceding updating iteration.

As described above, the noise component of the current data item is the noise that would be added to an output data item in order to generate the current data item. For example, at an iteration with time index t, i.e., the time point ("time step") corresponding to the updating iteration is t, the current data item $x_t$ can be expressed as $x_t=\alpha_t x_0+\sigma_t\varepsilon$, where $\varepsilon$ is a noise component and $x_0$ is the output data item. $\alpha_t$ and $\sigma_t$ can be determined according to a predetermined schedule across time indices t, e.g., a linear schedule, a quadratic schedule, a cosine schedule, and so on. In one example, $$\alpha_t=\sqrt{1-\sigma_t^2} \text{ and } \sigma_t$$

can be a value between zero and one, where the value is taken from a pre-determined schedule across time indices.

For example, at an updating iteration corresponding to reverse diffusion time index t, the current noisy data item $x_t$ is updated based on the denoising output for the updating iteration. The current noisy data item after being updated will be referred to as the updated noisy data item $x_{t-1}$; where the updated current data item for the final updating iteration may be taken as the output data item $x_0$. At any given updating iteration, the current noisy data item, which is provided as (a part of) the diffusion input, will be the updated current noisy data item that has been generated in the immediately preceding updating iteration. For the very first iteration, the current noisy data item is the initial noisy data item. At each updating iteration, the denoising output generated by the diffusion neural network is used to update the current data item as of the updating iteration. For example, when the denoising output is a prediction of the output data item, to generate the updated noisy data item $x_{t-1}$, the denoising output may be projected to the noise level corresponding to the time index t−1.

For example, at each iteration other than the last, an estimate of the updated current noisy data item is generated using the denoising output (used to generate an initial estimate of the output data item) and a diffusion sampler. The system can use any appropriate diffusion sampler to update the current noisy data item, e.g., the DDPM (Denoising Diffusion Probabilistic Model) sampler, the DDIM (Denoising Diffusion Implicit Model) sampler or another appropriate sampler, to the estimate to generate the updated current data item. DDPMs are, for example, discussed in Ho, et al., arXiv: 2006:11239. For the last iteration, the estimate can be the initial estimate generated using the denoising output or can be generated using the sampler. When the denoising output is an estimate of the noise component, the initial estimate of the output data item can be determined as $(x_t-\sigma_t\hat{\Sigma})/\alpha_t$, where $\hat{\varepsilon}$ is the denoising output. When the denoising output is an estimate of the output data item, the denoising output can be used as the initial estimate.

Some implementations make use of guidance when performing the reverse diffusion process. That is, the reverse diffusion process is sometimes a guided reverse diffusion process. For example, classifier guidance or classifier-free guidance may be used. Classifier-free guidance is described in, for example, Ho and Salimans, arXiv: 2207.12598.

The diffusion neural network may be trained on a set of training data items using a denoising score-matching objective (an example of an image reconstruction objective) to generate the denoising output. The denoising score-matching objective can measure an error, e.g., a mean-squared error, an L1 error, an L2 error or a different type of error, between (i) a denoising output generated by processing a diffusion input that includes a noisy data item generated by adding sampled noise to a training data item and (ii) a target denoising output generated from the training data item, from the sampled noise, or both. For example, when the denoising output is an estimate of the noise component of the current data item, the target denoising output can be the sampled noise. As another example, when the denoising output is an estimate of the target data item, the target denoising output can be the target data item.

In particular, to train the diffusion neural network using the score matching objective, a training method can comprise sampling (i) a data item from a set of training data items, (ii) one or more corresponding conditioning input(s) for the data item, (iii) a time step t for the training, e.g., uniformly at random from the time interval or according to a different distribution over the time interval, and (iv), and noise & from the noise distribution (which may be, e.g., a Gaussian noise distribution). The system can then generate a noisy data item $x_t$ by combining the target data item $x_0$ with the sampled noise & in accordance with the sampled time step t, e.g., by setting the noisy data item $x_t=\alpha_t x_0+\sigma_t \varepsilon$. The system can then process an input that includes the noisy data item $x_t$, data specifying the time step, and the conditioning input(s) using the diffusion neural network to generate a denoising output. The system can then compute an error between the denoising output and a target denoising output and use the error to train the diffusion neural network, e.g., by determining gradients of the error and then using the gradients to update the parameters of the diffusion neural network by applying an optimizer to (at least) the gradients. As a particular example, the denoising score-matching objective can measure an error, e.g., a mean-squared error, an L1 error, an L2 error or a different type of error, between (i) the denoising output and (ii) the target denoising output.

The token prediction objective used to train the token generation neural network or to train the media generation neural network when the media generation neural network is an autoregressive neural network may comprise a self-supervised objective. There are many different types of self-supervised objective function that may be used. As one example the system may be trained using a softmax cross entropy loss, e.g., using teacher forcing with a softmax cross entropy loss. As another example the system may be trained with an autoregressive negative log likelihood (NLL) loss, such as $$-\sum_{l=1}^{L} \log p(y_l|y_{<l})$$

for a multimodal input comprising an input sequence encoded as L tokens with the lth multimodal token $y_l$ conditioned on preceding multimodal tokens $y_{<l}$. As another example the system may be trained with a masking loss, e.g., a loss that requires the system to predict masked-out data such as masked out tokens. As another example the system can be trained using a self-supervised objective function that comprises a contrastive loss function (one that is dependent upon a positive example and one or more negative examples).

There are many reconstruction objectives that can be used, e.g., a mean squared error objective or, in implementations, a diffusion model objective as described above.

In some implementations, when the token generation neural network is trained jointly with the media generation neural network or the token generation neural network is trained while holding the media generation neural network fixed, the training includes backpropagating gradients of the reconstruction objective from the media generation neural network into the token generation neural network. If the media generation neural network includes a diffusion model, this can be from a sequence of generation steps, or from a selection of random t-steps.

As has already been described, the token generation neural network may include one or more self-attention neural network layers. During training, a causal mask may be applied to the self-attention neural network layers whilst the self-attention neural network layers are processing the multimodal tokens.

In some implementations, the token generation neural network can apply a causal mask to the self-attention neural network layers whilst the self-attention neural network layers are processing the multimodal tokens (e.g., when predicting a next text or audio tokens), i.e., so that at each time step the self-attention neural network layers see only past inputs in a sequence of processed inputs. In some of these implementations, for each media item, the token generation neural network uses bi-directional attention for the self-attention layers whilst the self-attention neural network layers are processing the media tokens representing the media item. This allows the self-attention layers to effectively incorporate information from the whole corresponding media item when updating any given media token.

In some implementations, the media item is generated by a separate model. As the model generates a media item (rather than a single media token) and all media tokens associated with the media item can be passed in parallel to the token generation neural network, bi-directional attention can be used, i.e., with no causal attention mask, whilst the self-attention neural network layers are processing the media tokens during training and at inference.

As described above, in some implementations, the media generation neural network may be a diffusion model. In such implementations, training the media generation neural network can comprise sampling a time step from a distribution, generating a noisy version of the training media item by adding noise to the training media item at a level determined by the time step, the added noise defining a noise media item added to the training media item, and processing the noisy version of the training media item and the time step using the media item generation neural network to generate the predicted media item.

The predicted media item may represent the noise media item. The media item reconstruction objective can depend on a difference (e.g., a mean square error) between the predicted media item and the noise media item (or of patches thereof). The predicted media item may represent a reconstructed version of the training media item. The media item reconstruction objective can depend on a difference between the predicted media item and the training media item.

In general, any diffusion model loss can be used. The added noise for a time step can be determined according to a predetermined noise schedule.

In some implementations, the diffusion model may be a latent variable diffusion model. That is, the method can involve generating a noisy version of the training media item, or a noisy latent vector representation thereof, by adding noise to the training media item to the latent vector representation thereof, at a level determined by the time step, the added noise defining a noise media item added to the training media item, or defining a noise latent vector added to the latent vector representation of the training media item. The method can also involve processing the noisy version of the training media item, or the noisy latent vector representation thereof, and the time step using the media item generation neural network to generate the predicted media item or a latent vector representation thereof. The predicted media item can represent either the noise media item or a reconstructed version of the training media item; or the noise latent vector or a reconstructed version of the latent vector representation of the training media item. The media item reconstruction objective can depend on, respectively, either a difference between the predicted media item and the noise media item, or between the latent vector representation of the predicted media item and the noise latent vector; or on a difference between the predicted media item and the training media item, or between the latent vector representation of the predicted media item and the latent vector representation of the training media item. When the diffusion model is a latent variable diffusion model, the final output media item can be generated by processing the final latent representation using a decoder neural network.

In some implementations the media item generation neural network can have a U-net architecture, e.g., as described above. The U-net architecture has one or more cross-attention neural network layers. Using the media item generation subsystem to generate the predicted media item conditioned on features representing the subsequence may comprise using the one or more cross-attention neural network layers to attend to features of the subsequence obtained by processing the subsequence using the token generation neural network.

In some implementations, the above-described methods could be combined with a pre-trained media item generation neural network and/or a pre-trained token generation neural network. For example, an existing large pre-trained LLM and Diffusion model could be fine-tuned in this setting.

Example tasks that can be implemented by the system 100 (e.g., after it has been trained) are now described.

In some implementations the method includes, after the training, using the system to perform an audio generation task. In such implementations, the method may include using the system to process a prompt sequence that defines an input sequence of multimodal tokens for the system. The prompt sequence may comprise text or audio that defines the audio generation task. The time series audio data for the audio waveform may define audio that is specified by the prompt sequence. The audio may include spoken words in a natural language.

The method may include using the system, after the training, to perform an image generation task or image processing task. In such implementations, the method may include using the system to process a prompt sequence that defines an input sequence of multimodal tokens for the system, wherein the prompt sequence comprises text or audio that defines an image generation task or image processing task, and wherein the image defines a result of the task.

The task may include generating an image specified by the prompt.

The prompt may include an image. The task may include generating a modified version of the image. A modification to be performed may be described by the prompt.

The prompt may include an image. The task may include an optical character recognition task that involves generating an output sequence of multimodal tokens that represents words or characters in the image.

The prompt may include an image. The task may include generating an output sequence of multimodal tokens that represents an answer to a question about the image.

The prompt may include an image and identifies one or more objects in the image. The task may include generating an output sequence of multimodal tokens that defines a presence, location, orientation, or count of one or more of the objects in the image.

The prompt may include an image. The task may include generating an output sequence of multimodal tokens that describes a content of the image or that classifies a content of the image into one or more of a plurality of categories.

The prompt may include an image and defines a goal for a mechanical agent acting in a real world environment. The task may include generating an output sequence of multimodal tokens that defines one or more actions to be performed by the mechanical agent to achieve the goal. In some implementations, the system is configured to cause the mechanical agent to perform the one or more actions defined by the output sequence of multimodal tokens.

The method may be performed prior to further training to perform the audio generation task. The method may be performed prior to further training to perform the image generation task or image processing task. That is, further training (e.g., fine tuning) may be performed following the training methods described herein.

A few further examples of some machine learning tasks that can be performed by the system 100 trained as described herein follow. In the examples below, where references are made to an image processing task, the task can also be an audio processing task (where appropriate).

In general the prompt sequence can comprise text and/or audio, e.g., speech that defines a task to be performed by the system (after training).

As one example the task may comprise generating an image specified by the prompt. The prompt may specify the content of the image, i.e., it may comprise a description of the image to be generated or (particularly where the prompt includes a still or moving image) the prompt may specify that the image should depict what is predicted to happen next.

As another example the prompt can include an image and the task may involve generating an edited or modified version of the image, where an edit or modification to be performed is described by the prompt. Some example modifications include generating another perspective or view of a subject depicted in the image, e.g., a view from a different angle or a close-up or zoomed out view; or a change in style of the image; or a change in context of the image (e.g., day< >night; raining< >not raining); and so forth. This may be used to incrementally refine the image.

As another example the prompt can include an image and the task may involve generating an output sequence of multimodal tokens that represents an answer to a question about the image. That is, the prompt may define any visual question answering task; this may involve reasoning about the content of the image.

The prompt may define a query. For example, the system can be used to detect objects in the video frames and provide information relating to the detected objects in response to a query. As another example, in particular where the image is a moving image, such a query may require predictive reasoning ("what will happen next"), counterfactual reasoning ("what would happen in a different circumstance"), explanatory reasoning ("why did something happen"), or causal reasoning generally. The query may comprise, for example, a request for a prediction of a future event or state relating to one or more of the objects (e.g., "will objects X and Y collide?"), or a request for conditional or counterfactual information relating to one or more of the objects (e.g., "what event would [not] happen if object X is modified, moved or absent?"), or a request for analysis of the video frames to determine a property or characteristic of one or more of the objects (e.g., "how many objects of type Z are moving?"). The response may, for example, be in the form of a text answer, e.g., a yes/no answer, or may, e.g., define the location of an object, or be in some other format. This can be used to predict whether or not two objects will collide, or how this may be avoided. For example, the system may be used, e.g., to provide a warning and/or to control motion of one or more of the objects.

As another example the prompt can include an image and can identify, e.g., by text description or in some other way, one or more objects in the image. The task may involve generating an output sequence of multimodal tokens that defines a presence, location (e.g., a bounding box), orientation, or count of one or more of the objects in the image. In implementations of the system, the way that images are encoded (and generated) facilitates tasks that involve processing fine, even pixel-level details of the image. For example, an image in the prompt or generated by the system could, e.g., include a segmentation mask that defines part of the task to be performed.

As another example the prompt can include the prompt includes an image and the task comprises generating an output sequence of multimodal tokens that describes a content of the image, e.g., an image captioning task, or that classifies a content of the image into one or more of a plurality of categories. Where the image is a moving image, this can include action, e.g., gesture, recognition.

As another example the prompt can include an image and defines a goal for a mechanical agent acting in a real world environment, and the task can involve generating an output sequence of multimodal tokens that defines one or more actions to be performed by the mechanical agent to achieve the goal, e.g., a task or sub-task of the mechanical agent, e.g., a mechanical robot.

Some other examples of tasks that may be performed include a text to speech task, where the prompt comprises text in a natural language and the system generates audio for corresponding speech; and a speech to text (speech recognition task), where the prompt comprises audio and the system generates corresponding natural language text.

Some further examples of tasks follow.

As one example the task may comprise an object or action detection task. A training data item may comprise an image or video containing one or more objects or actions, and a sequence of text. The sequence of text may describe or otherwise label the object(s) or action(s) and may include text giving bounding box coordinates for the object(s) or action(s). After training, when the system is used in inference, the system output may comprise or represent text that describes or otherwise labels detected object(s) or action(s) in the image input, and may include bounding-box coordinates for the detected object(s) or action(s), e.g., "10 20 90 100 cat 20 30 100 100 dog".

As another example the task may comprise a classification task, e.g., an object or action classification task. A training data item may comprise an image or video item containing one or more objects or actions and a sequence of text. The sequence of text may describe or otherwise classify the object(s) or action(s). After training, when the system is used in inference, the system output may comprise data, e.g., text, that classifies the object(s) or action(s) in the image input into one of a plurality of classes.

As another example the task may comprise an image or video describing task, e.g., a captioning task (which, as used here, includes an audio description task to explain what is happening in a video). A training data item may comprise an image or video and a sequence of text describing the image or video. After training, when the system is used in inference, the system output may comprise data, e.g., text, describing the image or video. For example, the system output may provide a caption or description, or it may count objects in the image or video, or it may provide some other form of description.

As another example the task may comprise an image or video question-answering task. A training data item may comprise an image or video and a sequence of text that describes the image or video. After training, when the system is used in inference, the system output may comprise data, e.g., text, that answers a question about the input specified in a prompt sequence of text, e.g., as described above. This may be used, e.g., to answer questions about visual plots and charts or about sounds.

As another example the task may comprise a character or word recognition task, e.g., an OCR (optical character recognition) task. A training data item may comprise an image or video and a sequence of text that includes text that is depicted in the image or video, or that is represented as speech in the audio item. After training, when the system is used in inference, the system output may comprise text that represents characters or words, e.g., in a natural language.

As another example the task may comprise a still or moving image generation task. As another example an image such as a plot or chart may be decoded from one or more (language) tokens generated by the system. A training data item for such a system may comprise an image or video and a sequence of text that describes the image or video. After training, when the system is used in inference, the system output may comprise data for an image or video, e.g., image data defining values for pixels of a still or moving image, and the sequence of text in the multimodal input to the system may describe or characterize the image or video to be generated.

As another example the task may comprise a computer language text generation task. A training data item may comprise an image or video and a sequence of text in a computer language for generating the image or video. After training, when the system is used in inference, the system output may comprise text in the or another computer language for generating or rendering an image or video, e.g., a web page, plot, or chart.

In another example of a computer language text generation task a training data item may comprise an image or video and a sequence of text in a computer language for performing a task in relation to the image or video, e.g., a data processing task that involves analyzing the content of the image or video to provide a result of the analysis or, e.g., a search to search for information relating to the content of the image or video. The computer language in the system output may comprise computer language for invoking a function or calling one or more external APIs. Merely as one example, such an output may be formatted as a JSON object. As previously, a sequence of text in the multimodal input may define the task to be performed and may comprise, e.g., an image or video in relation to which the task is to be performed, e.g., a task that involves manipulation of particular types of data that may benefit from access to an API such as mathematical data, date/time related data, scientific data, recent data that may post-date training of the system (that may be accessed by a search function or API), and so forth. After training, when the system is used in inference, the system output may comprise text in the or another computer language for performing a task, e.g., as described above, in relation to an image or video in the input. The method may then include using the text in the computer language to perform the task.

In general, where the system output comprises text this may be provided as speech representing the text.

In some implementations the machine learning task comprises an agent control task in which the agent interacts with an environment to perform the agent control task. In these implementations the multimodal input includes an observation characterizing the environment. For example, the multimodal input can include a sequence of text that defines the task to be performed by the agent and the image can represent an observation of the environment, e.g., captured by a camera or other imaging device from a real-world environment. A training data item may comprise a sequence of text representing one or more actions of the agent, and an image observation of the environment. After training, when the system is used in inference, the system output comprises an action selection output, e.g., including text, that is used to select one or more actions to be performed by the agent in the environment in response to the observation. As an illustration the system output 122 may define an action as text such as "A: 132 114 128 5 25 156", that can be converted into a control signal for a mechanical agent, such as a robot, e.g., "$\Delta T=[0.1,-0.2,0]$ $\Delta R=[10°, 25°,-7°]$". As another example the action selection output may also or instead define one or more low-level skills, e.g., from a vocabulary of previously learnt skills. As before, the sequence of text in the input to the system may describe the task to be performed, e.g., "What action should the robot take to [perform task]".

In some agent control implementations, the environment is a real-world environment and the agent is a mechanical agent interacting with the real-world environment, e.g., a robot or an autonomous or semi-autonomous land, air, or sea vehicle operating in or navigating through the environment, and the actions are actions taken by the mechanical agent in the real-world environment to perform the task. For example, the agent may be a robot or other mechanical agent interacting with the environment to accomplish a specific task, e.g., to locate or manipulate an object of interest in the environment or to move an object of interest to a specified location in the environment or to navigate to a specified destination in the environment. In these implementations, the observations may include, e.g., one or more of: images, object position data, and sensor data to capture observations as the agent interacts with the environment. The actions may define control signals to control the robot or other mechanical agent, e.g., positions, torques, or other control signals for the parts of the mechanical agent, or higher-level control commands.

In some agent control implementations, the agent may be a human agent and the environment may be a real-world environment. For example, the agent can be a human user of a digital assistant such as a smart speaker, smart display, or some other device that is used to instruct the user to perform actions. The task may be any real-world task that the user wishes to perform. The observations may be obtained from an observation capture subsystem, e.g., a monitoring system such as a video camera or sound capture system, to capture visual observations of the user performing the task. The actions may comprise instructions in the form of, e.g., text, image, video, or audio data such as speech, that guide the user in performing the task.

There are many large training datasets that may be used to pre-train the token generation neural network, the media generation neural network, or both, as described above. Just as some examples these include: WebLI (Web Language Image, Chen, et al., arXiv: 2305.18565v1); Open Images V4 (Kuznetsova, et al., arXiv: 1811.00982); Conceptual Captions (Sharma, et al., "Conceptual Captions: A Cleaned, Hypernymed, Image Alt-text Dataset for Automatic Image Captioning," ACL 2018); Kinetics (Kay, et al., arXiv: 1705.06950); for audio, AudioSet (Gemmeke, et al., "Audio set: An ontology and human-labeled dataset for audio events," ICASSP, IEEE, 2017, pp. 776-780); for robot control Bridgedata v2 (Walke, et al., "Bridgedata v2: A dataset for robot learning at scale." Conference on Robot Learning. PMLR, 2023). Data sets such as these can also be used to generate the training examples for, e.g., the training described above with reference to FIG. 5.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them. Thus a system, artificial neural network, or trained artificial neural network as described herein, can be implemented in hardware using electronic circuitry, e.g., in a physical box. Similarly, computer code as described herein can be code to emulate such hardware or code for a hardware description language.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system and can be stored in various ways. This includes being embedded within a file containing other programs or data (e.g., scripts within a markup language document), residing in a dedicated file, or distributed across multiple coordinated files (e.g., files storing modules, sub-programs, or code segments). A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed (or executed) on one computer or on multiple computers, whether located at one site or distributed across multiple sites and interconnected by a data communication network. The specific implementation of the computer programs may involve a combination of traditional programming languages and specialized languages or libraries designed for GPU programming or TPU utilization, depending on the chosen hardware platform and desired performance characteristics.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers. An engine is typically implemented as one or more software modules or components installed on one or more computers, which can be located at a single site or distributed across multiple locations. In some instances, one or more dedicated computers may be used for a particular engine, while in other cases, multiple engines may operate concurrently on the same one or more computers. Examples of engine functions within the context of AI and machine learning could include data pre-processing and cleaning, feature engineering and extraction, model training and optimization, inference and prediction generation, and post-processing of results. The specific design and implementation of engines will depend on the overall architecture and the distribution of computational tasks across various hardware components, including CPUs, GPUs, TPUs, and other specialized processors.

The processes and logic flows described in this specification can be performed by one or more programmable computers executing one or more computer programs to perform functions by operating on input data and generating output. Additionally, graphics processing units (GPUs) and tensor processing units (TPUs) can be utilized to enable concurrent execution of aspects of these processes and logic flows, significantly accelerating performance. This approach offers significant advantages for computationally intensive tasks often found in AI and machine learning applications, such as matrix multiplications, convolutions, and other operations that exhibit a high degree of parallelism. By leveraging the parallel processing capabilities of GPUs and TPUs, significant speedups and efficiency gains compared to relying solely on CPUs can be achieved. Alternatively or in combination with programmable computers and specialized processors, these processes and logic flows can also be implemented using special purpose logic circuitry, e.g., an FPGA or an ASIC, or by a combination of special purpose logic circuitry and one or more programmed computers, for even greater performance or energy efficiency in specific use cases.

Computers suitable for the execution of a computer program can be based on general or special purpose microprocessors or both, or any other kind of central processing unit. Generally, a central processing unit will receive instructions and data from a read-only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Computers capable of executing a computer program can be based on general-purpose microprocessors, special-purpose microprocessors, or a combination of both. They can also utilize any other type of central processing unit (CPU). Additionally, graphics processing units (GPUs), tensor processing units (TPUs), and other machine learning accelerators can be employed to enhance performance, particularly for tasks involving artificial intelligence and machine learning. These accelerators often work in conjunction with CPUs, handling specialized computations while the CPU manages overall system operations and other tasks. Typically, a CPU receives instructions and data from read-only memory (ROM), random access memory (RAM), or both. The essential elements of a computer include a CPU for executing instructions and one or more memory devices for storing instructions and data. The specific configuration of processing units and memory will depend on factors like the complexity of the AI model, the volume of data being processed, and the desired performance and latency requirements. Embodiments can be implemented on a wide range of computing platforms, from small embedded devices with limited resources to large-scale data center systems with high-performance computing capabilities. The system may include storage devices like hard drives, SSDs, or flash memory for persistent data storage.

Computer-readable media suitable for storing computer program instructions and data encompass all forms of non-volatile memory, media, and memory devices. Examples include semiconductor memory devices such as read-only memory (ROM), solid-state drives (SSDs), and flash memory devices; hard disk drives (HDDs); optical media; and optical discs such as CDs, DVDs, and Blu-ray discs. The specific type of computer-readable media used will depend on factors such as the size of the data, access speed requirements, cost considerations, and the desired level of portability or permanence.

To facilitate user interaction, embodiments of the subject matter described in this specification can be implemented on a computing device equipped with a display device, such as a liquid crystal display (LCD) or an organic light-emitting diode (OLED) display, for presenting information to the user. Input can be provided by the user through various means, including a keyboard), touchscreens, voice commands, gesture recognition, or other input modalities depending on the specific device and application. Additional input methods can include acoustic, speech, or tactile input, while feedback to the user can take the form of visual, auditory, or tactile feedback. Furthermore, computers can interact with users by exchanging documents with a user's device or application. This can involve sending web content or data in response to requests or sending and receiving text messages or other forms of messages through mobile devices or messaging platforms. The selection of input and output modalities will depend on the specific application and the desired form of user interaction.

Machine learning models can be implemented and deployed using a machine learning framework, e.g., a TensorFlow framework or JAX. These frameworks offer comprehensive tools and libraries that facilitate the development, training, and deployment of machine learning models.

Embodiments of the subject matter described in this specification can be implemented within a computing system comprising one or more components, depending on the specific application and requirements. These may include a back-end component, such as a back-end server or cloud-based infrastructure; an optional middleware component, such as a middleware server or application programming interface (API), to facilitate communication and data exchange; and a front-end component, such as a client device with a user interface, a web browser, or an app, through which a user can interact with the implemented subject matter. For instance, the described functionality could be implemented solely on a client device (e.g., for on-device machine learning) or deployed as a combination of front-end and back-end components for more complex applications. These components, when present, can be interconnected using any form or medium of digital data communication, such as a communication network like a local area network (LAN) or a wide area network (WAN) including the Internet. The specific system architecture and choice of components will depend on factors such as the scale of the application, the need for real-time processing, data security requirements, and the desired user experience.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote (e.g., geographically separated) from each other and typically interact through a communication network. The specific type of network, such as a local area network (LAN), a wide area network (WAN), or the Internet, will depend on the reach and scale of the application. The client-server relationship is established through computer programs running on the respective computers and designed to communicate with each other using appropriate protocols. These protocols may include HTTP, TCP/IP, or other specialized protocols depending on the nature of the data being exchanged and the security requirements of the system. In certain embodiments, a server transmits data or instructions to a user's device, such as a computer, smartphone, or tablet, acting as a client. The client device can then process the received information, display results to the user, and potentially send data or feedback back to the server for further processing or storage. This allows for dynamic interactions between the user and the system, enabling a wide range of applications and functionalities. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers and for generating multimodal data using a system comprising a token generation neural network and a media generation neural network, the method comprising:

obtaining a multimodal input that comprises a set of one or more media items and one or more prompt tokens of a different modality;

processing each of the one or more media items using a first media encoder neural network to generate a respective set of media tokens for each of the one or more media items;

generating an input sequence of multimodal tokens that comprises the prompt tokens and the media tokens for the one or more media items;

processing the input sequence of multimodal tokens using the token generation neural network to generate an output sequence of multimodal tokens, comprising:

determining that a criterion is satisfied as of a given multimodal token in the output sequence; and in response:

processing each of the one or more media items using a second media encoder neural network to generate a respective encoded representation for each of the one or more media items; and generating an output media item using the media generation neural network conditioned on (i) features representing a current output sequence of multimodal tokens as of the given multimodal token obtained from the token generation neural network and (ii) the encoded representations of the one or more media items.

2. The method of claim 1, wherein generating the output sequence of multimodal tokens comprises autoregressively, for each successive position in the output sequence of multimodal tokens:

processing a combined sequence comprising the input sequence of multimodal tokens and a current output sequence of multimodal tokens, using the token generation neural network, to generate a next multimodal token for the output sequence of multimodal tokens, and appending the next multimodal token to the current output sequence of multimodal tokens.

3. The method of claim 1, wherein determining that a criterion is satisfied as of a given multimodal token in the output sequence comprises determining that the next multimodal token is a start-of-media token.

4. The method of claim 1, wherein the first media encoder neural network is different from the second media encoder neural network.

5. The method of claim 1, wherein the first media encoder neural network is the second media encoder neural network.

6. The method of claim 1, wherein processing the input sequence of multimodal tokens using the token generation neural network to generate an output sequence of multimodal tokens further comprises:

processing the output media item to generate a sequence of media tokens; and appending the sequence of media tokens to the current output sequence of multimodal tokens as the next multimodal tokens in the output sequence of multimodal tokens after the given multimodal token.

7. The method of claim 6, wherein processing the input sequence of multimodal tokens using the token generation neural network to generate an output sequence of multimodal tokens further comprises:

continuing to generate, using the token generation neural network, further multimodal tokens after appending the sequence of media tokens to the current output sequence of multimodal tokens.

8. The method of claim 7, wherein the token generation neural network comprises one or more self-attention neural network layers, the method further comprising applying a causal mask to the self-attention neural network layers whilst the self-attention neural network layers are processing the multimodal tokens, and using bi-directional attention whilst the self-attention neural network layers are processing the media tokens.

9. The method of claim 6, wherein processing the output media item to generate a sequence of media tokens comprises processing the output media item using the first media encoder neural network to generate the sequence of media tokens.

10. The method of claim 1, wherein the one or more prompt tokens comprise tokens representing one or more of text or audio data.

11. The method of claim 1, wherein the output sequence of multimodal tokens comprises multimodal tokens representing text or audio data elements.

12. The method of claim 1, wherein the media generation neural network is a diffusion neural network, and wherein generating the output media item comprises:

initializing the media item or a latent representation thereof, by sampling values for elements of the media item or for the latent representation from a noise distribution; and at each of a series of time steps: determining an updated version of the media item or the latent representation thereof, by processing data specifying the time step, and the media item or the latent representation thereof, at the time step, using the media generation neural network conditioned on (i) the features representing a current output sequence of multimodal tokens as of the given multimodal token obtained from the token generation neural network and (ii) the encoded representations of the one or more media items, to determine a reduced noise version of the media item or of the latent representation thereof.

13. The method of claim 1, wherein the features representing the current output sequence of multimodal tokens as of the given multimodal token obtained from the token generation neural network comprise:

i) respective output embeddings for at least a subset of the multimodal tokens in a current input sequence generated by a last attention layer block of the generative neural network by processing the current input sequence using the generative neural network, wherein the current input sequence comprises the current output sequence;

ii) a respective output embedding for a predetermined additional token generated by the last attention layer block by processing an updated sequence that includes the predetermined additional token appended to the current input sequence using the token generation neural network; or iii) both.

14. The method of claim 1, wherein the media generation neural network has been trained on a task that requires generating output media items conditioned on features generated by the token generation neural network while holding the token generation neural network fixed.

15. The method of claim 14, wherein the media generation neural network has been pre-trained on a different media generation task prior to the training on the task that requires generating output media items conditioned on features generated by the token generation neural network.

16. The method of claim 14, wherein the second media encoder neural network is trained jointly with the media generation neural network on the task that requires generating output media items conditioned on features generated by the token generation neural network while holding the token generation neural network fixed.

17. The method of claim 14, wherein the second media encoder neural network is held fixed while the media generation neural network is trained on the task that requires generating output media items conditioned on features generated by the token generation neural network while holding the token generation neural network fixed.

18. The method of claim 1, wherein the input sequence of multimodal tokens further comprises media tokens representing one or more additional media items and wherein the media tokens for the set of one or more media items follow the media tokens representing the one or more additional tokens in the sequence.

19. The method of claim 1, wherein the one or more prompt tokens specify one or more edits to be applied to the one or more media items to generate the output media item.

20. A system comprising:

one or more computers; and one or more storage devices communicatively coupled to the one or more computers, wherein the one or more storage devices store instructions that, when executed by the one or more computers, cause the one or more computers to generate an output media item using a token generation neural network and a media generation neural network, the operations comprising:

obtaining a multimodal input that comprises a set of one or more media items and one or more prompt tokens of a different modality;

processing each of the one or more media items using a first media encoder neural network to generate a respective set of media tokens for each of the one or more media items;

generating an input sequence of multimodal tokens that comprises the prompt tokens and the media tokens for the one or more media items;

processing the input sequence of multimodal tokens using the token generation neural network to generate an output sequence of multimodal tokens, comprising:

determining that a criterion is satisfied as of a given multimodal token in the output sequence; and in response:

processing each of the one or more media items using a second media encoder neural network to generate a respective encoded representation for each of the one or more media items; and generating an output media item using the media generation neural network conditioned on (i) features representing a current output sequence of multimodal tokens as of the given multimodal token obtained from the token generation neural network and (ii) the encoded representations of the one or more media items.

21. One or more non-transitory computer storage media storing instructions that when executed by one or more computers cause the one or more computers to generate an output media item using a token generation neural network and a media generation neural network, the operations comprising:

obtaining a multimodal input that comprises a set of one or more media items and one or more prompt tokens of a different modality;

processing each of the one or more media items using a first media encoder neural network to generate a respective set of media tokens for each of the one or more media items;

generating an input sequence of multimodal tokens that comprises the prompt tokens and the media tokens for the one or more media items;

processing the input sequence of multimodal tokens using the token generation neural network to generate an output sequence of multimodal tokens, comprising:

determining that a criterion is satisfied as of a given multimodal token in the output sequence; and in response:

processing each of the one or more media items using a second media encoder neural network to generate a respective encoded representation for each of the one or more media items; and generating an output media item using the media generation neural network conditioned on (i) features representing a current output sequence of multimodal tokens as of the given multimodal token obtained from the token generation neural network and (ii) the encoded representations of the one or more media items.

* * * * *